United States Patent
Axmon et al.

(10) Patent No.: US 10,412,642 B2
(45) Date of Patent: *Sep. 10, 2019

(54) METHOD AND APPARATUS FOR PERFORMING RADIO MEASUREMENTS IN AUTONOMOUS GAPS IN MULTI-CONNECTIVITY SCENARIOS

(71) Applicant: Telefonaktiebolaget LM Ericsson (publ), Stockholm (SE)

(72) Inventors: Joakim Axmon, Limhamn (SE); Muhammad Kazmi, Bromma (SE); Imadur Rahman, Sollentuna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/908,886

(22) Filed: Mar. 1, 2018

(65) Prior Publication Data

US 2018/0192338 A1    Jul. 5, 2018

Related U.S. Application Data

(63) Continuation of application No. 14/857,249, filed on Sep. 17, 2015, now Pat. No. 9,949,183.
(Continued)

(51) Int. Cl.
*H04W 4/00* (2018.01)
*H04W 36/00* (2009.01)
(Continued)

(52) U.S. Cl.
CPC ....... *H04W 36/0083* (2013.01); *H04L 5/0055* (2013.01); *H04W 24/10* (2013.01); *H04W 36/0069* (2018.08); *H04W 36/0094* (2013.01)

(58) Field of Classification Search
None
See application file for complete search history.

(56) References Cited

U.S. PATENT DOCUMENTS

| | | |
|---|---|---|
| 2008/0192660 A1 | 8/2008 | Li et al. |
| 2010/0216470 A1 | 8/2010 | Pamp et al. |

(Continued)

FOREIGN PATENT DOCUMENTS

EP    2385723 A1    11/2011

OTHER PUBLICATIONS

3GPP, "3rd Generation Partnership Project; Technical Specification Group Radio Access Network; Evolved Universal Terrestrial Radio Access (E-UTRA); Physical channels and modulation (Release 12)", 3GPP TS 36.211 V12.3.0, Sep. 2014, pp. 1-124.

(Continued)

*Primary Examiner* — Bob A Phunkulh
(74) *Attorney, Agent, or Firm* — Murphy, Bilak & Homiller, PLLC

(57) ABSTRACT

In one aspect of the teachings herein, a wireless device operating in a multi-connectivity configuration with respect to an associated wireless communication network applies asymmetrical blanking to two or more of its multi-connectivity connections in conjunction with acquiring system information for a target cell during one or more measurement gaps. "Blanking" as used here implies an interruption in downlink reception, or an interruption in uplink transmission, or both, and arises as a consequence of the measurement gaps used by a wireless device to make measurements on target-cell signals. Asymmetrical blanking results in, for example, the wireless device sending more or less acknowledgment/non-acknowledgment, ACK/NACK, signaling on one of the connections relative to another one of the connections, when acquiring the target-cell system infor- (Continued)

mation. In some embodiments, asymmetrical blanking is triggered and/or configured by the network, while in other embodiments it is triggered and/or configured by the wireless device.

14 Claims, 15 Drawing Sheets

Related U.S. Application Data

(60) Provisional application No. 62/052,298, filed on Sep. 18, 2014.

(51) Int. Cl.
*H04W 24/10* (2009.01)
*H04L 5/00* (2006.01)

(56) References Cited

U.S. PATENT DOCUMENTS

| | | |
|---|---|---|
| 2010/0322169 A1 | 12/2010 | Narasimha et al. |
| 2011/0053585 A1 | 3/2011 | Otonari et al. |
| 2011/0081913 A1 | 4/2011 | Lee et al. |
| 2012/0195265 A1 | 8/2012 | Kim et al. |
| 2012/0230293 A1 | 9/2012 | Grinshpun et al. |
| 2013/0028126 A1 | 1/2013 | Kazmi |
| 2013/0083740 A1 | 4/2013 | Eriksson et al. |
| 2013/0208665 A1 | 8/2013 | Baldemair et al. |
| 2014/0126498 A1 | 5/2014 | Koorapaty et al. |
| 2015/0117283 A1 | 4/2015 | Wei et al. |
| 2015/0282146 A1 | 10/2015 | Nigam et al. |

OTHER PUBLICATIONS

3GPP, "3rd Generation Partnership Project; Technical Specification Group Radio Access Network; Evolved Universal Terrestrial Radio Access (E-UTRA); Radio Resource Control (RRC); Protocol specification (Release 12)", 3GPP TS 36.331 V12.2.0, Jun. 2014, pp. 1-365.
3GPP, "3rd Generation Partnership Project; Technical Specification Group Radio Access Network; Evolved Universal Terrestrial Radio Access (E-UTRA); Requirements for support of radio resource management (Release 12)", 3GPP TS 36.133 V12.4.0, Jul. 2014, pp. 1-870.
3GPP, "3rd Generation Partnership Project; Technical Specification Group Radio Access Network; Universal Terrestrial Radio Access (UTRA) and Evolved Universal Terrestrial Radio Access (E-UTRA); Radio measurement collection for Minimization of Drive Tests (MDT); O", 3GPP TS 37.320 V10.0.0, Dec. 2010, pp. 1-17.
Unknown, Author, "Acquisition of SeNB SFN in the dual connectivity", 3GPP TSG RAN WG4 Meeting #71 R4-142726 Seoul, Korea Source: Ericsson, May 19-23, 2014, pp. 1-3.
Unknown, Author, "CGI reading requirements for DC for FDD and TDD", Ericsson, 3GPP TSG RAN WG4 Meeting #74bis, R4-151456, Rio de Janeiro, Brazil, Apr. 20-24, 2015, pp. 1-10.
Unknown, Author, "Discussion on measurement gap of DC", ZTE, 3GPP TSG-RAN2 Meeting #86, R2-142013, Seoul, Korea, May 19-23, 2014, pp. 1-4.
Unknown, Author, "Further discussion on measurement gap in Dual connectivity", Intel Corporation, 3GPP TSG-RAN WG4 Meeting #72, R4-145265, Dresden, Germany, Aug. 18-22, 2014, pp. 1-4.
Unknown, Author, "Measurement gap configuration for Dual Connectivity", Broadcom Corporation, 3GPP TSG-RAN WG2 Meeting #85bis, R2-141599, Valencia, Spain, Mar. 31-Apr. 4, 2014, pp. 1-6.
Unknown, Author, "Measurement gap configuration in Dual Connectivity", Qualcomm Incorporated, 3GPP TSG-RAN WG2 meeting #86, R2-142517, Seoul, Korea, May 19-23, 2014, pp. 1-3.
Unknown, Author, "RAN4#71 Meeting Report", 3GPP TSG-RAN WG4 Meeting #72 R4-144081 Dresden, Germany, Aug. 18-22, 2014, pp. 1-499.
Unknown, Author, "Report and summary of email discussion [86#29] [LTE/DC] RRM measurements", Huawei, 3GPP TSG-RAN WG2 Meeting #87, R2-143808(Revision of R2-143347), Dresden, Germany, Aug. 18-22, 2014, pp. 1-34.
Unknown, Author, "Requirements for DC on ACK/NACK reporting for measurements using autonomous gaps", Ericsson, 3GPP TSG-RAN WG4 Meeting #75, R4-15xxxx, Change Request 36.133 v13.0.0, Fukuoka, Japan, May 25-29, 2015, pp. 1-4.

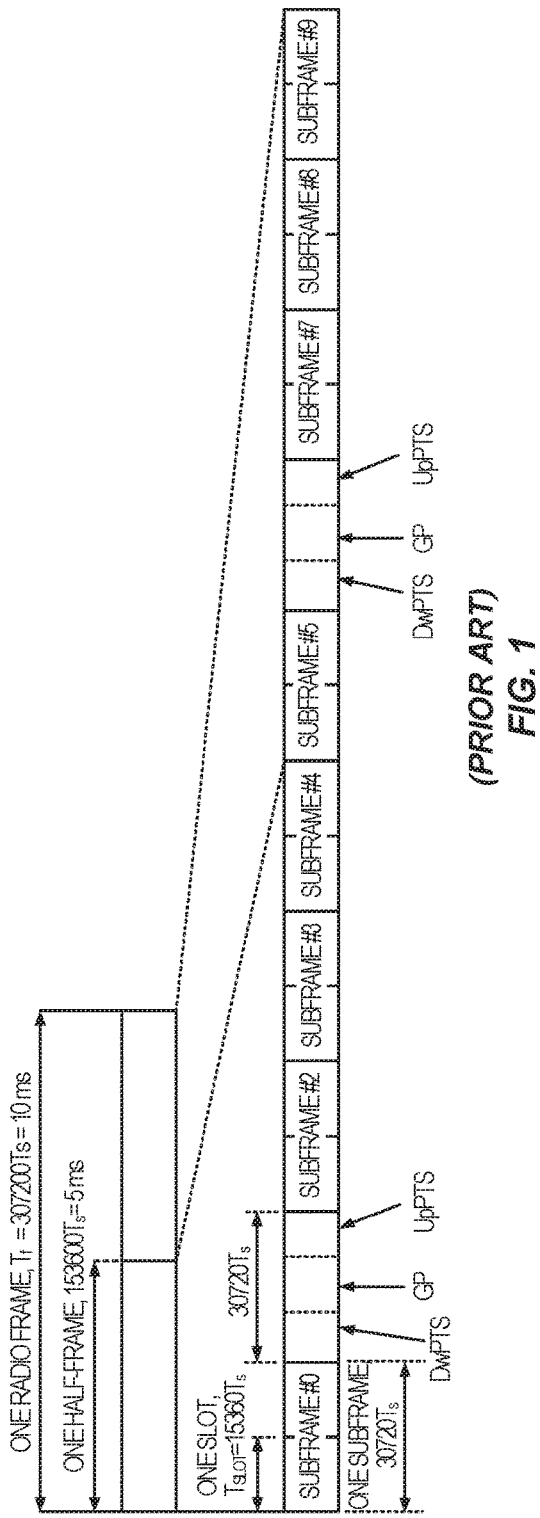

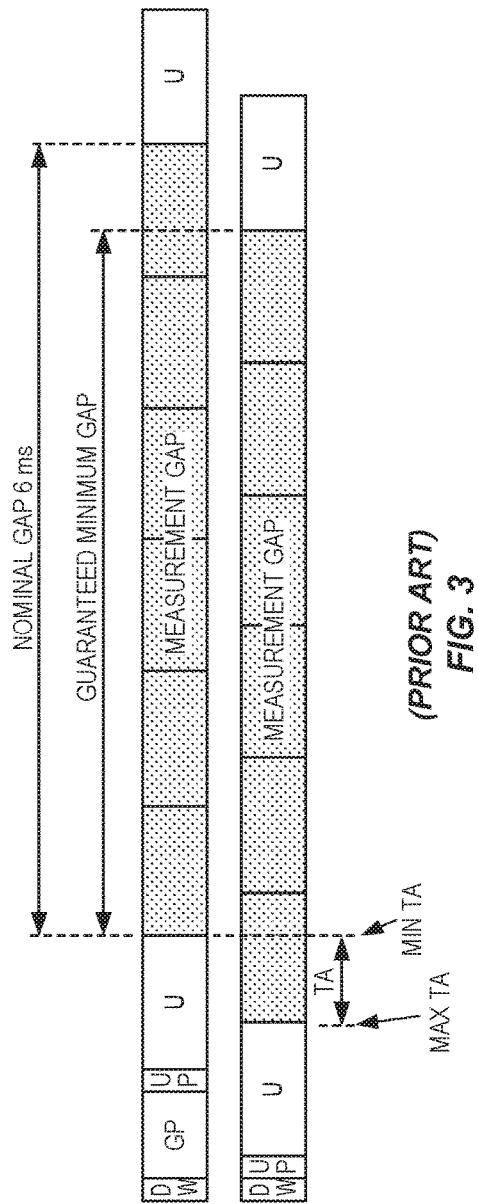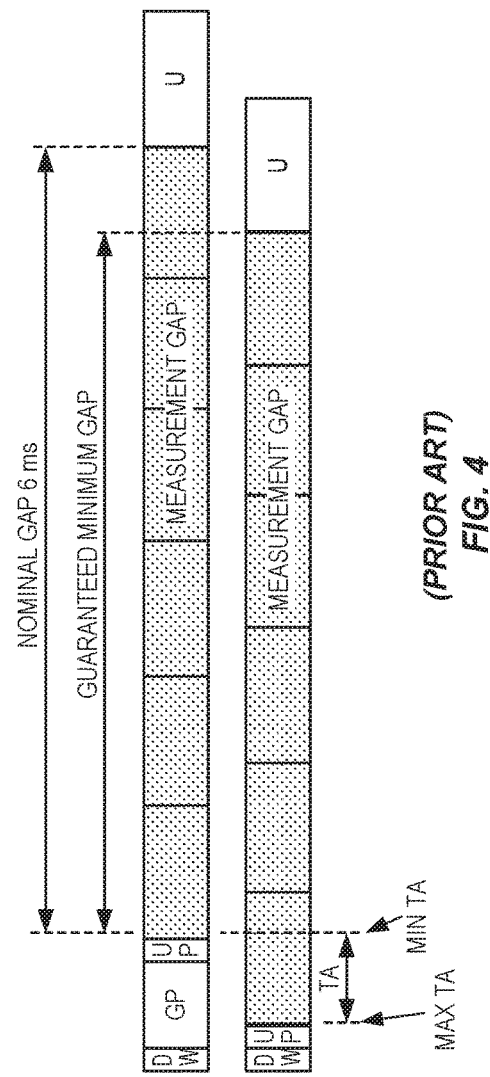

*"VARIATION A"*

FIG. 9 "VARIATION B"

"VARIATION C"

*"VARIATION D"*

"VARIATION E"

METHOD AND APPARATUS FOR PERFORMING RADIO MEASUREMENTS IN AUTONOMOUS GAPS IN MULTI-CONNECTIVITY SCENARIOS

RELATED APPLICATIONS

This application is a continuation of U.S. application Ser. No. 14/857,249 filed Sep. 17, 2015, which claims benefit of U.S. Provisional Application No. 62/052,298 filed Sep. 18, 2014. The entire contents of each of the aforementioned applications are incorporated herein by reference.

TECHNICAL FIELD

The present invention generally relates to multi-connectivity operation in a wireless communication network, and particularly relates to the use of asymmetrical blanking on two or more multi-connectivity connections, e.g., in association with a wireless device acquiring system information for a neighboring cell.

BACKGROUND

Preserving orthogonality between uplink. UL, transmissions from multiple user equipments. UEs, in a Long Term Evolution, LTE, network requires time alignment at the receiving radio base stations, which are denoted as "eNodeBs" or "eNBs" according to the Third Generation Partnership Project, 3GPP, lexicon. Correspondingly, a given eNB controls the UL transmit timing of the UEs operating under its control, to ensure that the signals transmitted by the UEs arrive at the eNB aligned in time. i.e., well within the cyclic prefix, CP. The so-called "normal" CP length in LTE is about 4.7 μs.

UL timing alignment ensures that the eNB can reliably use the same resources, such as Discrete Fourier Transform, DFT, or Fast Fourier Transform, FFT, resources, to receive and process UL signals incoming from multiple UEs. Timing Advance, TA, commands provide the mechanism by which the eNB controls the UL transmission timing of individual UEs, to ensure that the eNB receives the UL signals from the different UEs in time-aligned fashion. According to the TA mechanism, the eNB sends TA commands to a UE based on measurements on UL transmissions from that UE. For example the eNodeB measures two way propagation delay or round trip time for each UE, to determine the value of the TA required for that UE. For a TA command received by a UE on subframe n, the corresponding adjustment of the uplink transmission timing shall be applied by the UE from the beginning of subframe n+6. The TA command indicates the change of the uplink timing relative to the current uplink timing of the UE transmission as multiples of 16 Ts, where Ts=32.5 ns and is called basic time unit in LTE.

In case of random access response, an 11-bit timing advance command, $T_A$, for a Timing Advance Group. TAG, indicates $N_{TA}$ values by index values of $T_A=0, 1, 2, \ldots$, 1282. Thus, the amount of the timing alignment for the TAG is given by $N_{TA}=T_A \times 16$. In other cases, a 6-bit timing advance command, $T_A$, for a TAG indicates adjustment of the current $N_{TA}$ value, $N_{TA,old}$, to the new $N_{TA}$ value, $N_{TA,new}$, by index values of $T_A=0, 1, 2, \ldots, 63$, where $N_{TA,new}=N_{TA,old}+(TA-31) \times 16$. Here, adjustment of the $N_{TA}$ value by a positive or a negative amount indicates advancing or delaying the uplink transmission timing for the TAG by a given amount respectively. Timing advance updates are signaled by the eNB to the UE in Medium Access Control. MAC, Protocol Data Units. PDUs.

As a general rule, a UE performs inter-frequency and inter-RAT measurements in measurement gaps, unless it is capable of performing them without gaps. Here, "RAT" denotes "Radio Access Technology" and "inter-RAT" denotes measurements by a UE on a different radio technology, such as where the UE is operating in a E-UTRAN—E-UTRAN denotes Evolved Universal Terrestrial Radio Access Network—and measures one or more cells of a UTRAN. To enable inter-frequency and inter-RAT measurements for a UE that requires gaps, the network has to configure the measurement gaps.

Two periodic measurement gap patterns both with a measurement gap length of 6 ms are defined for LTE. The first pattern, denoted as measurement gap pattern #0, has a repetition period of 40 ms. The second pattern, denoted as measurement gap pattern #1, has a repetition period of 80 ms. Measurements performed by the UE during configured measurement gaps are reported to the network, which uses them for various tasks. The following measurements are specified or can be performed by a LTE-based UE during configured measurement gaps: inter-frequency cell detection or cell identification; inter-frequency Reference Signal Received Power, RSRP, measurements; inter-frequency Reference Signal Received Quality, RSRQ, measurements; inter-frequency Reference Signal Time Difference, RSTD, measurements; inter-RAT cell identification; and inter-RAT measurements, such as Common Pilot Channel or CPICH measurements, Received Signal Code Power or RSCP measurements, Carrier to Interference measurements, received signal strength measurements, etc.

The measurement gaps are used in all duplex modes of operation, including Frequency Division Duplex or FDD, Time Division Duplex or TDD, and Half Duplex FDD, denoted as HD-FDD or simply HD. In HD operation, the UL and Downlink. DL, transmissions take place on different paired carrier frequencies but are not simultaneous in time in the same cell. This fact means that the UL and DL transmissions take place in different time resources. e.g. in different symbols, time slots, subframes or frames. In other words, the UL and DL subframes do not overlap in time. The number and location of subframes used for DL. UL or unused subframes can vary from frame to frame, or can vary across multiples of frames.

FIG. 1 illustrates a known frame structure as defined for E-UTRA TDD. In particular, the illustrated frame structure corresponds to the different UL/DL TDD configurations depicted in the table shown in FIG. 2. In the table, "U" denotes an UL subframe, "D" denotes a DL subframe, and "S" denotes a special subframe that is divided into a DL portion, DwPTS, and an UL portion, UpPTS, separated by a guard period, GP. Note that the measurements gaps having subframe offsets of 3 and 8 are squeezed in between two uplink subframes, for UUDL configuration #0. FIG. 3 illustrates this circumstance. Measurement gaps with offsets of 2 and 7 subframes are squeezed in between a special subframe and an uplink subframe, for UL/DL configurations #0, #1 and #6. FIG. 4 illustrates these circumstances.

Regarding measurements performed by a UE in a LTE network in autonomous measurement gaps, in E-UTRAN—the type of RAN used in LTE networks—the serving cell can request the UE to acquire the Cell Global Identifier, CGI, of a given target cell. CGIs uniquely identify cells within a network. To acquire the CGI of a target cell, the UE has to read at least part of the System Information, SI, of the target cell, including the Master Information Block. MIB, and the relevant System Information Block, SIB, as described later.

Acquiring the CGI of a target cell involves reading the SI of the target cell during measurement gaps, which are autonomously created by the UE. An "autonomous measurement gap" is a gap in reception at the UE, a gap in transmission at the UE, or a gap in both reception and transmission at the UE. A UE creates such gaps at a point in time determined by the UE, for instance to allow time for reconfiguration of its radio circuitry to acquire system information from a neighbor cell or to perform other kinds of signal measurements. Reconfiguration includes, for example, tuning to another cell or frequency.

According to Section 5.5.3.1 of 3GPP Technical Specification (TS) 36.331, version 12.7.0, a UE reads the MIB and the SystemInformationBlockType1 or SIB1 of a target cell, to obtain the CGI of the target cell. The term "E-CGI" or "ECGI" is used rather than "CGI", when the target cell is an E-UTRAN intra- or inter-frequency cell.

In LTE, FDD mode acquisition of the MIB and SIB1 by a UE for a target cell assumes that the UE needs to perform Automatic Gain Control, AGC, on the target cell carrier before reading the MIB and SIB1. E-UTRA FDD MIB and SIB1 acquisition. See, e.g., 3GPP TS 36.133 version 12.7.0. A further assumption is that four subframes may have to be blanked—interrupted or ignored—for acquiring each of the target cell MIB blocks and SIB1 Redundancy Versions. RV. Still further, it is assumed that three blocks of the MIB and four RVs are needed from the SIB1, for the same 40 and 80 ms period, respectively. For acquiring each of the MIB and the SIB1, five gaps with a duration of 4 ms each are allowed. One of the five gaps may be permitted to be 5 ms, in view of AGC/AFC operations. FIG. 5 illustrates these details, where B1, B2, B3 and B4 denote blocks of the Physical Broadcast Channel or PBCH.

Further in LTE, the MIB includes a limited number of the most essential and the most frequently transmitted parameters that are needed to acquire other information from the cell, and is transmitted on the Broadcast Control Channel. BCH, of the target cell. In particular, the following information is currently included in MIB: DL bandwidth, Physical Hybrid Automatic Repeat reQuest, HARQ, Indicator Channel, PHICH, configuration, and System Frame Number or SFN. The MIB is transmitted periodically with a periodicity of 40 ms and repetitions are made within 40 ms. The first transmission of the MIB is scheduled in subframe #0 of radio frames for which the SFN mod 4=0, and repetitions are scheduled in subframe #0 of all other radio frames.

In LTE the SIB1 contains the following information: Public Land Mobile Network, PLMN, identity; Cell identity; Close Subscriber Group, CSG, identity and indication; Frequency band indicator; SI-window length; and scheduling information for other SIBs transmitted in the target cell. The LTE SIB1 may also indicate whether a change has occurred in the SI messages. A UE is notified about coming changes in the SI by a paging message, from which the UE recognizes that the SI for the cell will change at the next modification period boundary. The modification period boundaries are defined by SFN values for which (SFN mod m)=0, where m is the number of radio frames comprising the modification period. The modification period is configured by system information.

The LTE SIB1 is transmitted on the DL Shared Channel or D-SCH, as are the other SIBs. The SIB1 is transmitted with a periodicity of 80 ms and repetitions made within 80 ms. The first transmission of SIB1 is scheduled in subframe #5 of radio frames for which the SFN mod 8=0, and repetitions are scheduled in subframe #5 of all other radio frames for which SFN mod 2=0.

In case of inter-RAT UTRAN, the UE reads the MIB and SIB3 of the target UTRAN cell to acquire its CGI. More generally, the UE may perform measurements in autonomous gaps to determine the CGI of a given target cell on the same frequency as the serving cell(s) of the UE and having the same RAT as the serving cell(s). However, the target cell may be on a different frequency and/or operate according to a different RAT, and the gap-based measurements therefore may be inter-frequency and/or inter-RAT.

A number of well-known scenarios exist where the serving cell of a UE requests that the UEs report the CGI of a target cell. These scenarios include: verification of a CSG cell; establishment of Automatic Neighbor Relations. ANR, in a Self-Organizing Network. SON, context; Minimization of Drive Test, MDT, operations; and verification of CSG cell for CSG inbound mobility.

To support mobility within the network, a UE is required to identify a number of neighbor cells and report their Physical Cell Identities, PCIs, to the serving network node. The serving network node is, for example, a serving eNB in the E-UTRAN. The UE may also be requested to report measurement results for one or more of the neighbor cells, such as RSRP and/or RSRQ in E-UTRAN or CPICH RSCP and/or CPICH Ec/No in UTRAN, GERAN carrier RSSI, or pilot strength for CDMA2000/HRPD, where "HRPD" denotes High Rate Packet Data. The serving network node uses the measurements reported by the UE to make handover decisions with respect to the UE, for example.

Dense deployment scenarios involve smaller cell sizes and the PCIs are more frequently reused. Small cell examples include "femto" or "pico" cells, and broadly encompass the use of CGS cells, such as with home base stations, etc. To avoid commanding the UE to move from its current serving cell to a restricted cell, e.g., a cell subject to CSG membership, the serving network node may request that the UE decode and report the target cell CGI. Because CGIs are unique within a network, having the target cell CGI enables the serving network node to determine whether the target cell corresponds to a macro base station or other non-CSG access point, or corresponds to an access point having CSG restrictions.

Specifications related to E-UTRAN define CGI reporting procedures. A key aspect of CGI decoding is that CGI determination is performed by a UE during autonomous measurement gaps created by the UE. This arrangement arises from the fact that the typical UE is incapable of simultaneously receiving data from the serving cell while acquiring the SI of a target cell. Furthermore, CGI acquisition in inter-frequency or inter-RAT contexts requires the UE to switch carrier frequencies. Hence, autonomous gaps are inevitably required for a UE to obtain the SI of a target cell. The autonomous gaps are created in both the DL and the UL.

Another usage of autonomous measurement gaps at a UE involves ANRs in the SON context. To ensure correct establishment of neighbor cell relations, a serving cell requests that a UE report the CGI of a new target cell, whose PCI is identified and reported to the serving cell. The CGI acquisition requires the UE to acquire the SI of the target cell, and is thus carried out by the UE during the autonomous gaps. CGI acquisition for ANR purposes therefore also leads to interruption of data reception at the UE with respect to the serving cell.

Further, Release 10 of the 3GPP specifications for LTE and High Speed Packet Access, HSPA, introduced MDT features aimed at reducing the effort needed to gather network coverage and performance information, such as is used for network planning and optimization. The MDT feature requires that the UEs log or obtain various types of measurements, events and coverage related information. The logged or collected measurements or relevant information are then sent to the network. This approach contrasts with traditional approaches in which the network operator collects similar information using actual drive tests and associated manual logging.

The 3GPP TS 37.320 V.10 describes the MDT feature in more detail, but it may be helpful to note some of the measurements that may be made or collected by a UE operating in a network in a connected mode or at least in certain low-activity states. For example, the UE may measure, log and subsequently report: mobility measurements, e.g., RSRP, RSRQ etc.; random access failures; paging channel failures; broadcast channel failures; and radio link failures.

A UE can also be configured to report the CGI of target cells along with other measurements, such as RSRP, RSRQ, etc. Existing measurement procedures are used to obtain the CGI of a target cell for MDT purposes, in cases where the UE is in the connected mode. With respect to idle mode operation, the UE can be configured to log the cell measurements along with the corresponding CGIs, and subsequently report the logged measurements to the network at a suitable occasion, such as when the UE goes to connected mode. CGI acquired for MDT purposes is based on the UE making the required measurements during autonomous measurement gaps.

The use of carrier aggregation, CA, involves certain considerations regarding the use of autonomous measurement gaps by a UE, for acquiring target-cell SI. In a CA configuration example, a UE is configured to have a Primary Cell or PCell and a Secondary Cell or SCell. In this context, the UE applies SI acquisition and SI-change monitoring procedures for the PCell only. For SCells. E-UTRAN provides, via dedicated signaling, all SI relevant for operation in RRC_CONNECTED mode when adding the SCell. Hence, the UE creates autonomous gaps on the PCell DL and UL, for reading a neighbor-cell CGI. E-UTRAN therefore specifies a number of SI/CGI acquisition requirements for the following scenarios: intra-frequency CGI reporting, where CGI is denoted as E-CGI in the E-UTRAN context; inter-frequency E-CGI reporting; and inter-RAT UTRAN CGI reporting.

The UE is required to report intra-frequency E-CGI for a target intra-frequency cell within about 150 ms, provided that the Signal-to-Interference-plus-Noise Ratio, SINR, for the target cell at the UE is at least −6 dB or higher. During acquisition of the E-CGI for the target cell on the serving carrier frequency, the UE is allowed to create autonomous gaps in the DL and UL. Under continuous allocation, the UE is required to transmit a certain number of Acknowledgments/Non-Acknowledgments, ACKs/NACKs, on the UL. This requirement ensures that the UE does not create excessive gaps.

The UE is also required to report the inter-frequency E-CGI within about 150 ms from a target inter-frequency cell, provided that the SINR of the target cell at the UE is at least −4 dB or higher. During acquisition of the E-CGI for the target cell on the target carrier frequency, the UE is allowed to create autonomous gaps in the serving cell DL and UL. These gaps represent interruptions in DL reception and UL transmission at the UE with respect to the serving cell. However, when the UE has a continuous DL allocation in the serving cell, the UE is required to transmit certain number of ACK/NACK on the serving-cell UL. This requirement ensures that the UE does not create excessive gaps.

The minimum number of ACKs/NACKs that the UE is required to send under continuous DL allocation is specified as a requirement that UE has to meet. The minimum number of ACK/NACK transmissions by the UE for E-UTRA FDD is 60 ACKs/NACKs. For E-UTRA TDD, the minimum number of ACKs/NACKs depends upon the UL-DL TDD configuration. For example, the UE is required to send eighteen ACKs/NACKs for UL-DL TDD configuration #0, and thirty ACKs/NACKs for UL-DL TDD configurations #1.

In UTRAN, acquisition of the CGI for a target cell takes much longer, e.g., longer than one second, with the actual amount of time depending upon the periodicity of the SIB3 transmissions in the target cell. The SystemInformationBlockType3 or SIB3 contains the CGI. These circumstances mean that the UE may interrupt its serving cell data transmissions and receptions for 600 ms or longer, when acquiring the CGI of a UTRAN target cell.

LTE imposes no requirements on UEs regarding the acquisition of CGI for an E-UTRAN cell in parallel with performing other intra- or inter-frequency or inter-RAT measurements. Examples of such other measurements are intra-frequency cell search, RSRP. RSRQ, radio link monitoring or inter-frequency cell search, RSRP. RSRQ or inter-RAT UTRAN cell search. CPICH measurements, etc. Yet other examples are the positioning measurements such as UE Receive-Transmit, Rx-Tx, time difference measurements, TA measurements, eNB Rx-Tx time differences, etc. These positioning-related measurements require measurements on signals transmitted in the UL.

In general, the use of autonomous measurement gaps by the UE may adversely affect the requirements of such other measurements. In particular, the autonomous gaps in the UL affect positioning measurements that involve or rely on the measurement of UL signals transmitted by the UE.

The use of autonomous measurement gaps also affects "Dual Connectivity" or DC operation of a UE. With DC, a UE can be served by two eNBs simultaneously, with one eNB referred to as the Master eNB, MeNB, and the other eNB referred to as the Secondary eNB. SeNB. Further, the UE is configured with a Primary Component Carrier or PCC, for both the MeNB and the SeNB. The PCC of the MeNB is associated with a Primary Cell or PCell. and the PCC of the SeNB is associated with a Primary Secondary Cell or PSCell. The PCell and PSCell typically operate independently with respect to the UE. FIG. 6 illustrates a number of UEs operating in DC configurations—i.e., having both a MeNB and a SeNB.

The DC configuration also includes one or more Secondary Component Carriers or SCCs from each of the MeNB and the SeNB. The SCCs are associated with corresponding secondary serving cells, referred to as SCells. Other DC-related terminology includes the term Master Cell Group or MCG, and Secondary Cell Group or SCG. The MCG denotes the PCell and the SCells, if any, of the MeNB, while the SCG denotes the PSCell and the SCells, if any, of the SeNB.

A UE equipped for DC operation typically has separate transmitter and receiver resources to support each of the two connections—i.e., transceiver circuitry for its radio links with the MeNB and transceiver circuitry for its radio links with the SeNB. This separation allows the MeNB and the SeNB to independently configure the UE with respect to certain radio procedures involving the PCell and the PSCell, such as radio link monitoring, Discontinuous Reception, DRX, cycles, etc.

Two operational modes are considered in the context of DC, with the first being implemented in Release 12 of the 3GPP specifications for E-UTRA, and with the latter to be specified in a later release. The first mode is referred to as "synchronized operation", where DL timing at the UE for the MeNB and the SeNB is synchronized down to about half an OFDM symbol, which in LTE is about ±33 µs. Thus, in synchronized DC operation, the time difference, $\Delta\tau$, between signals received at the UE from the serving cells of the MeNB should be aligned in time within ±33 µs of the signals received at the UE from the serving cells of the SeNB. For the unsynchronized mode of operation, DL timing at the UE for the MeNB and the SeNB is synchronized down to half a subframe, which is ±500 µs in the LTE context.

More generally, one may define synchronized operation in the DC context as the case where the received signal time difference $\Delta\tau$ is within a first range capped by a time value, denoted as threshold $\Gamma1$. Similarly, one may define unsynchronized operation in the DC context as the case where the received signal time difference $\Delta\tau$ is within a second range capped by a time value, denoted as threshold $\Gamma2$. Thus, synchronized operation applies where $\Delta\tau<\Gamma1$, and unsynchronized operation applies where $\Gamma1<\Delta\tau<\Gamma2$. Operation also may be deemed to be unsynchronized if $\Delta\tau$ is allowed to have any arbitrary value.

FIG. 7 illustrates example synchronized and unsynchronized cases. In the diagram. "MRTD" denotes "maximum received signal time difference" and should be understood as corresponding to the above-mentioned $\Delta\tau$.

DC operation contemplates the following duplex mode configurations: MeNB FDD, SeNB FDD; MeNB FDD, SeNB TDD; MeNB TDD. SeNB FDD; and MeNB TDD, SeNB TDD. Moreover, UUDL configurations for TDD cells may be different for different carriers. With momentary reference to FIG. 3, it may be noted that the GP of special subframes seen in the TDD mode of operation may be different as between the communication links used in one connection and the communication links used in the other connection, to account for different timing advance values being used at the MeNB and at the SeNB with respect to the UE. The difference between GP length as between cells is mainly due to differences in timing advance. To achieve a particular timing advance. GP may be reduced accordingly. The net effect in the blanking context is that the whole gap shrinks because the timing advance value also dictates the transmission timing for uplink subframes immediately following a measurement gap.

However, it is currently not specified how a UE should carry out acquisition of SI for a target cell when the UE is configured for DC operation. If conventional approaches hold, the UE in question would apply its configured measurement gaps uniformly to the MeNB carriers and the SeNB carriers. In other words, the MeNB carriers would be interrupted or "blanked" for the same duration(s) as the SeNB carriers.

It is recognized herein that symmetrical blanking by a UE of the MeNB and SeNB carriers does not account for special circumstances, requirements and opportunities for improved operation in the context of DC operation. For example, it is recognized herein that in dual connectivity operation, the SFN between cells of the MCG and the SCG is not aligned in the most general case. Thus, at any given time, the SFN of the cells in the MCG may not be the same as the SFN of the cells in the SCG.

It is further recognized herein that the application of measurement gaps by the UE is complicated in the DC case, because the subframe boundaries can be time misaligned as between the MCG cells and the SCG cells. For example, the transmit timings of a subframe in the MCG cells may be shifted in time by as much as 0.5 ms in relation to the corresponding timings in the SCG cells. Consequently, the imposition of a measurement gap by the UE on any given CC involved in its DC configuration may impact other involved CCs in an unpredictable manner. In other words, it is recognized herein that symmetrical or uniform blanking of the CCs involved in DC or other "multi-connectivity" operating configurations is undesirable, at least under certain circumstances.

SUMMARY

In one aspect of the teachings herein, a wireless device operating in a multi-connectivity configuration with respect to an associated wireless communication network applies asymmetrical blanking to two or more of its multi-connectivity connections in conjunction with acquiring system information for a target cell during one or more measurement gaps. "Blanking" as used here implies an interruption in downlink reception, or an interruption in uplink transmission, or both, and arises as a consequence of the measurement gaps used by a wireless device to make measurements on target-cell signals. Asymmetrical blanking results in, for example, the wireless device sending more or less acknowledgment/non-acknowledgment. ACK/NACK, signaling on one of the connections relative to another one of the connections, when acquiring the target-cell system information. In some embodiments, asymmetrical blanking is triggered and/or configured by the network, while in other embodiments it is triggered and/or configured by the wireless device.

In one embodiment, a wireless device performs a method. The wireless device is configured for operation in a wireless communication network that supports multi-connectivity operation where the wireless device has at least two multi-connectivity connections with the network, with each connection corresponding to a different cell group. CG, in the network. The method includes determining that system information is to be acquired for a target cell, determining that asymmetrical blanking is to be applied by the wireless device to two or more connections of the at least two multi-connectivity connections, in association with acquiring the system information, and applying (asymmetrical blanking to the two or more connections, according to an asymmetrical blanking configuration).

In another embodiment, a wireless device is configured for operation in a wireless communication network that supports multi-connectivity operation, where the wireless device has at least two multi-connectivity connections with the network, and where each connection corresponds to a different CG in the network. The wireless device includes a communication interface configured for transmitting signals to the network and receiving signals from the network, and further includes a processing circuit that is operatively associated with the communication interface. The processing circuit is configured to determine that system information is to be acquired for a target cell, determine that asymmetrical blanking is to be applied by the wireless device to two or more connections of the at least two multi-connectivity connections, in association with acquiring the system information, and apply asymmetrical blanking to the two or more connections, according to an asymmetrical blanking configuration.

In another embodiment, a network node is configured for operation in a wireless communication network that supports multi-connectivity operation where a wireless device has at least two multi-connectivity connections with the network, and where each connection corresponds to a different CG in the network. The network node includes a communication interface configured for transmitting signals to the wireless device and receiving signals from the wireless device, and a processing circuit that is operatively associated with the communication interface. The processing circuit is configured to determine that the wireless device should apply asymmetrical blanking to two or more connections of the at least two multi-connectivity connections, when acquiring system information for a target cell and send an indication of that determination to the wireless device.

In yet another embodiment, a method at a network node includes determining that a wireless device should apply asymmetrical blanking to two or more connections of at least two multi-connectivity connections, when acquiring system information for a target cell. Here, the network node in question is configured for operation in a wireless communication network that supports multi-connectivity operation where the wireless device has at least two multi-connectivity connections with the network, and where each connection corresponds to a different CG in the network. The method further includes sending an indication of the determination to the wireless device.

Of course, the present invention is not limited to the above features and advantages. Those of ordinary skill in the art will recognize additional features and advantages upon reading the following detailed description, and upon viewing the accompanying drawings.

BRIEF DESCRIPTION OF THE DRAWINGS

FIG. 1 is a diagram of a "Type 2" air interface or radio frame structure, as used in Long Term Evolution, LTE, networks in Time Division Duplex, TDD, mode.

FIG. 2 is a table of defined Uplink/Downlink, UL/DL, TDD configurations, as defined by 3GPP TS 36.211 V12.3.0.

FIG. 3 is a diagram of UL/DL Configuration #0 from the table of FIG. 2, for an alignment of measurement gaps with "offset 3" or 8 subframes.

FIG. 4 is a diagram of UL/DL Configurations #0, 1 and 6 from the table of FIG. 2, for an alignment of measurement gaps with "offset 2" or 7 subframes.

DETAILED DESCRIPTION

Figure 5:
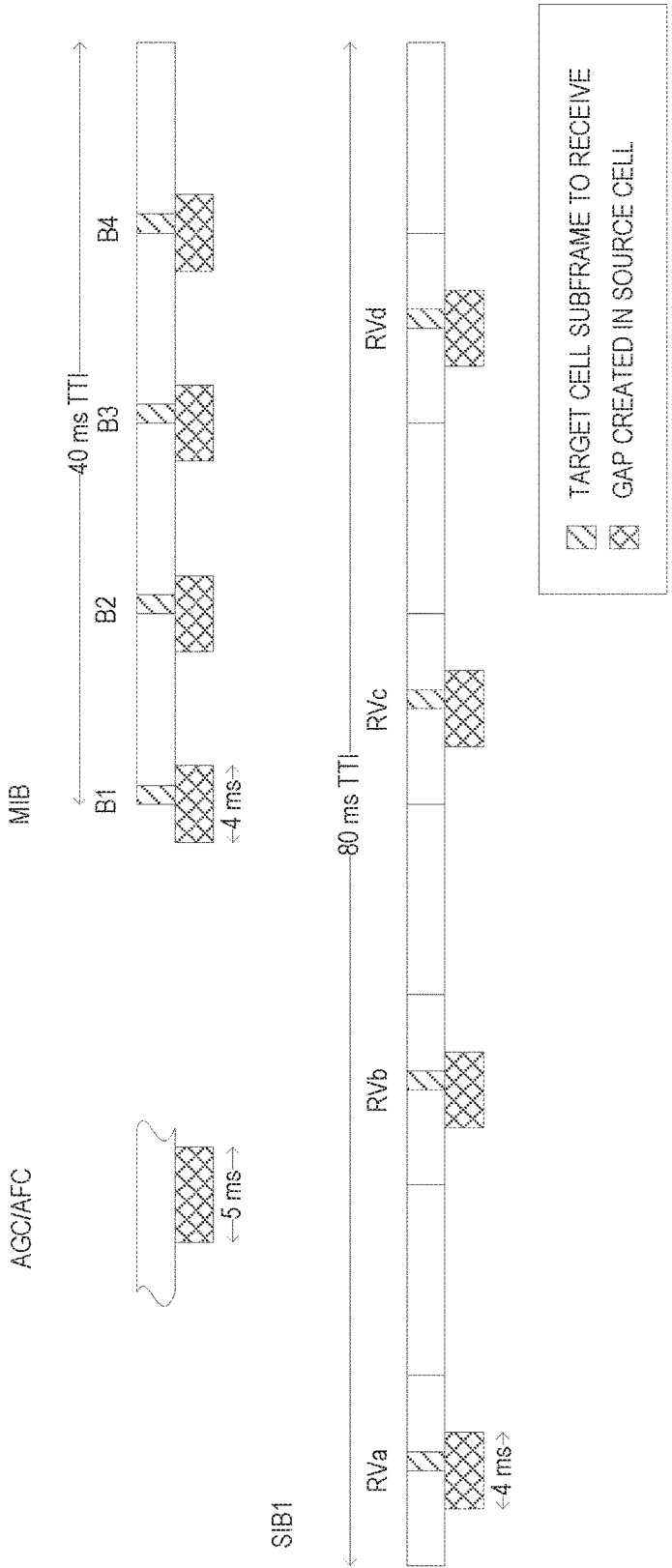
FIG. 5 is a diagram of Master Information Block, MIB, and System Information Block 1, SIB1, acquisition by a User Equipment. UE, or other wireless device, in a LTE Frequency Division Duplex, FDD, mode.
Figure 6:
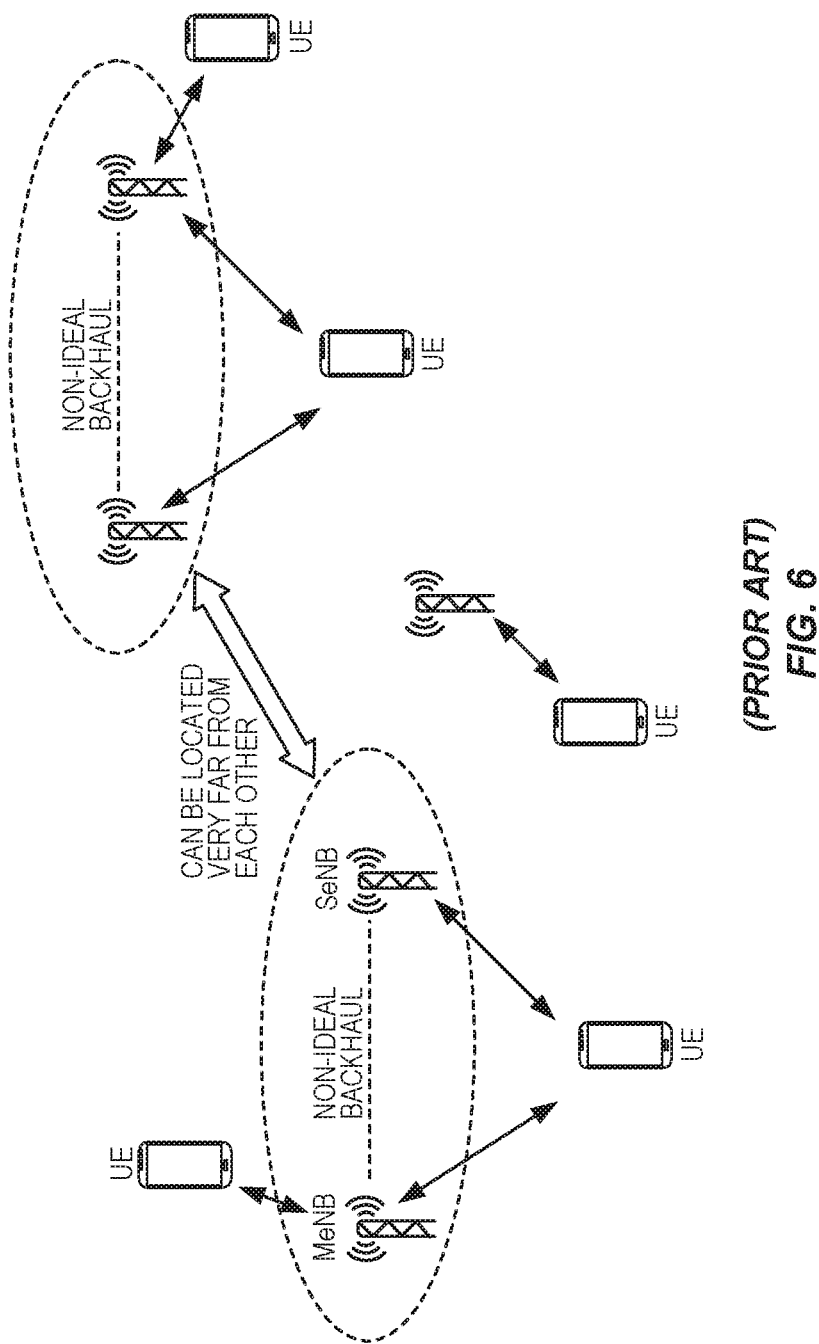
FIG. 6 is a block diagram of a wireless communication network according to known dual-connectivity operations.
Figure 7:
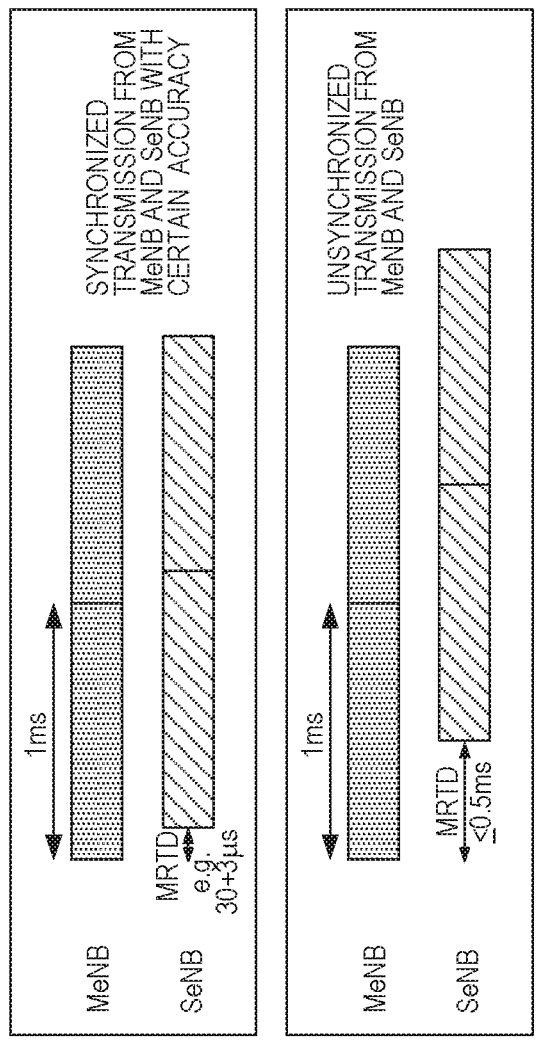
FIG. 7 is a diagram of a maximum receive timing difference, for synchronized and unsynchronized modes of "dual connectivity" or DC operation in LTE.

This disclosure uses the term "network node" from time to time and unless otherwise noted the term broadly encompasses any type of network node in a communication network that communicates directly or indirectly with wireless devices operating in the network and/or with one or more other nodes in the network. Examples of network nodes include radio base stations, such as NodeBs in a WCDMA-based network and eNBs in a LTE-based network, or other types of radio network access points such as relay nodes, remote radio heads, etc. Other example network nodes include so-called Core Network, CN, nodes, such as Mobile Switching Centers, MSCs. or Mobility Management Entities, MMEs, such as are used in LTE-based networks.

This disclosure also uses the term "wireless device" and, unless otherwise noted, that term should be broadly construed to cover essentially any type of wireless apparatus that is configured for operating within a wireless communication network. Non-limiting examples include User Equipments. UEs, such as are referred to in the 3GPP standards and the term encompasses Machine-to-Machine, M2M, devices, as well as the full gamut of mobile devices intended for consumer, business or industry usage.

Further, much of the discussion herein explicitly or implicitly refers to LTE network, LTE node types, and LTE protocols or specifications. However, these examples shall be understood as non-limiting and the teachings herein are directly applicable to any Radio Access Technology, RAT, wherein wireless devices use measurement gaps and corresponding serving-connection blanking, when acquiring System Information. SI, or making other such measurements on target-cell signals. It shall also be appreciated that the teachings herein apply to multi-connectivity operation—where a given wireless device is configured to have more than one serving connection to the network—in single-carrier and multi-carrier or Carrier Aggregation, CA, contexts. The terms "CA" or "Carrier Aggregation" may be used interchangeably with terms such as "multi-carrier system". "multi-cell operation", "multi-carrier operation", and "multi-carrier" transmission and/or reception.

In the below description, use of the term "fz" refers to the E-UTRA Absolute Radio-Frequency Channel Number, EARFCN, of a downlink carrier of a target cell whose Cell Global Identity, CGI, is to be acquired by a given wireless device and reported to an involved wireless communication network. In this context and unless otherwise noted, one may assume that the wireless device is configured for multi-connectivity operation with respect to the network. Reporting may be done with respect to a Master eNB or MeNB of the wireless device, for example. The EARFCN belongs to a particular band, and therefore fz is interchangeably used for denoting the carrier frequency and the associated frequency band.

In a Dual-Connectivity or DC example, the wireless device has connections to a Master Cell Group, MCG, and to a Secondary Cell Group, SCG. Using more general notation, in a DC configuration, the wireless device has a connection with a Cell Group X, CGx, and with a Cell Group Y, CGy. The CGx may be the MCG or Primary Cell Group, PCG, and the CGy may be the SCG. The PCG and SCG each represent one or more EARFCNs that belong to one or mode bands. Therefore, the terms "PCG" and "SCG" are interchangeably used below for denoting carrier frequencies and frequency bands.

Of course, the teachings herein generally extend to more than two CGs and more generally apply to "multi-connectivity" configurations and operations, with DC being an included example case. By way of example, the teachings herein apply to cases where the wireless device in question is configured for triple-connectivity, quadruple-connectivity, etc. In general, when one says that a wireless device has multi-connectivity capability, what is meant is that the wireless device is capable of using radio resources provided by at least two distinct serving connections to the network. In a specific example of multi-connectivity operation, the wireless device has connections to two or more different network points, e.g., to at least two different radio base stations in the network.

Each such connection may involve one cell or more than one cell, e.g., a first connection includes links between the network and the wireless device on a PCell and a SCell provided by a MeNB, and a second connection includes links between the network and the wireless device on a PSCell provided by a SeNB. In one example of such operation, the MeNB anchors control-plane signaling between the network and the wireless device, while user-plane traffic may be exchanged over the MeNB and/or SeNB connection(s). The MeNB and the SeNB are generally understood to have non-ideal backhaul connections and inter-node interfaces between them. e.g., the "X2" inter-eNB interface defined in LTE.

In multi-connectivity operation, each downlink carrier is received at the wireless device using a corresponding receiver. Here. "receiver" may comprise physically separate circuitry, but also may comprise functionally or logically separate circuitry. Similarly, each uplink carrier involved in the device's multi-connectivity operation is supported by a corresponding transmitter at the wireless device. These receivers and transmitters may reside on one or more radiofrequency. RF, integrated circuits. ICs.

Consider the case of "inter-band aggregation", where different carriers are in different frequency bands or ranges and a different receiver within the wireless device is used at least for each different frequency band or range. Conversely, for a case where two or more carriers are contiguous in frequency, the wireless device may be able to use a single receiver to receive on the two or more carriers, and then split the received carriers into separate sample streams for transfer from a radio front-end to a corresponding baseband processing circuit. Alternatively, radio receiver front-end circuitry may send one sample stream representing samples from two or more carriers, and the baseband processing circuitry is correspondingly configured to split the sample stream into different sets of resource elements—modulation symbols—after having processed the samples with an FFT. This scenario represents the so called "intra-band contiguous carrier aggregation" case.

Thus, consider the case where a total of four downlink carriers are involved in a dual-connectivity scenario where the wireless device is supported by a first CG and a second CG. In a particular example, the wireless device is served by a Primary Component Carrier, PCC, and a Secondary Component Carrier, SCC, in the first CG and by a PCC and a SCC in the second CG. It may be that the wireless device uses four different receivers—i.e., a one-to-one mapping between received downlink carriers and device receivers. Or, it may be that the wireless device maps two or more of the involved downlink carriers to the same receiver, such that there is not a one-to-one mapping between every involved downlink carrier and device receiver. The particular mapping or mappings used by the wireless device depend, of course, on a number of variables, such as: the number of receivers available in the device, the bandwidth(s) or other capabilities of those receivers, the configuration and capabilities of the device's downstream digital signal processing, the absolute and/or relative frequencies of the involved downlink carriers, etc.

It will be appreciated that conventional wireless devices use autonomous measurement gaps to make measurements on signals from a target cell, such as when acquiring SI for the target cell. It will also be appreciated that reception and/or transmission at the wireless device may be interrupted as a consequence of the wireless device allocating or repurposing at least a portion of its transceiver circuitry for receiving target-cell signals during one or more of the autonomous measurement gaps—also referred to as "measurement gaps" or simply "gaps." These interruptions amount to a "blanking" of the affected connections between the wireless device and the network. Advantageously, according to the teachings herein, a wireless device operating in a multi-connectivity configuration uses asymmetrical blanking, at least under certain conditions, when acquiring system information for a target cell. With asymmetrical blanking, the amount or extent of connection interruption is asymmetrical, as between two or more of the connections involved in the multi-connectivity configuration. For example, in a DC example where the wireless device has a MCG connection and a SCG connection, the MCG connection is interrupted for a shorter period of time than the SCG connection.

The asymmetrical blanking configuration used by the wireless device for applying asymmetrical blanking to its two or more connections in a multi-connectivity operating scenario may be determined in dependence on which device receiver(s) is/are used to tune to a target cell for SI acquisition. In an example embodiment, if the selected receiver is currently in use for one of the connections but not the other connection(s), then at least the downlink carrier(s) associated with that receiver will be blanked in accordance with the measurement gaps needed for acquiring the target cell system information. However, the wireless device may apply only partial blanking to the receivers being used to support the other connection(s). For example, because these other receivers are not being used to obtain the target cell system information, their operation may need to be interrupted only briefly, e.g., during brief "transient" windows associated with reconfiguring the selected receiver or supporting circuitry within the wireless device to the target cell, or retuning the selected receiver back to the carrier(s) it was previously in use for.

Figure 8:
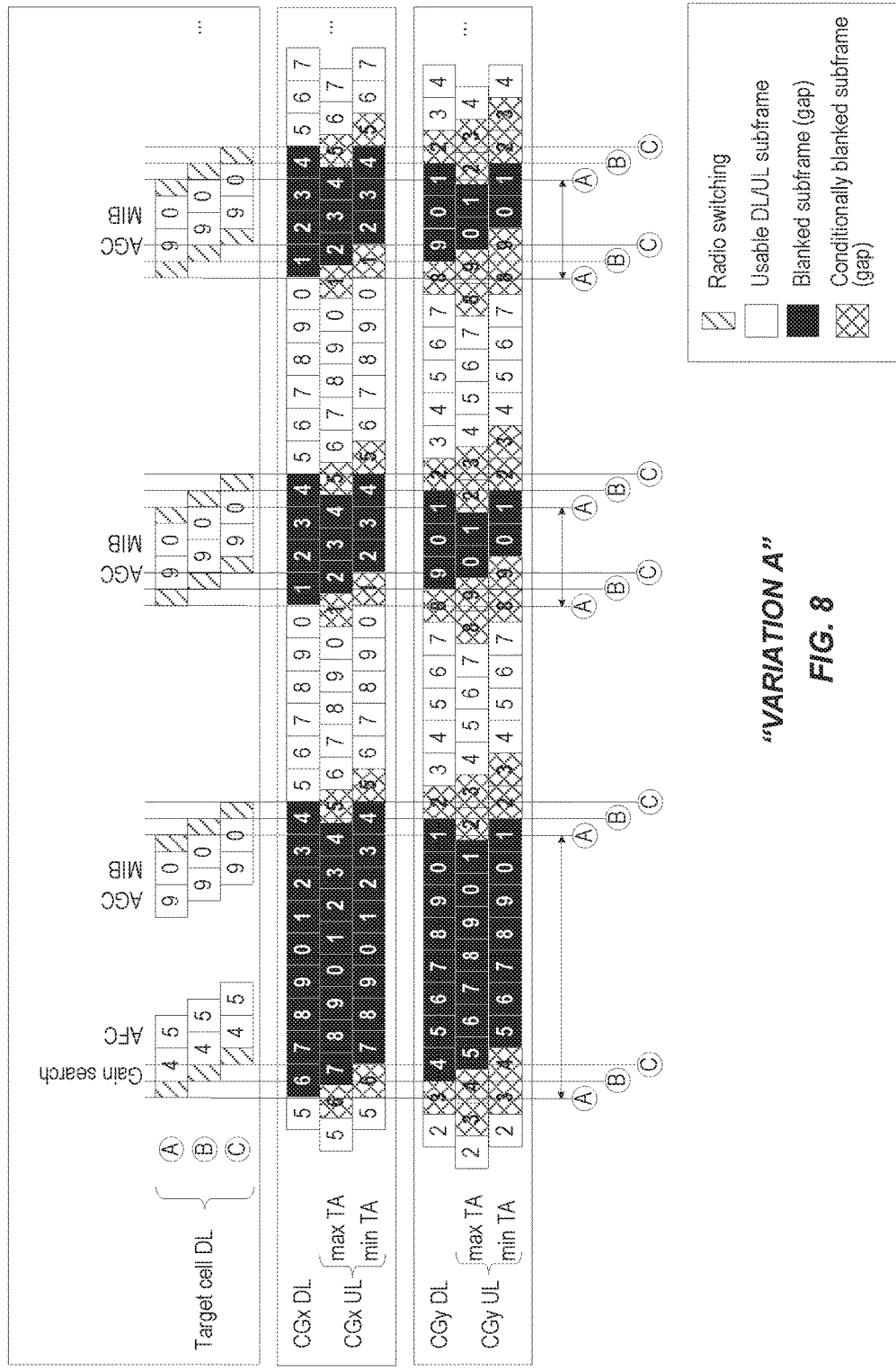
FIGS. 8-12 are diagrams of various embodiments of asymmetrical blanking as taught herein, for two connections among two or more multi-connectivity connections of a wireless device.

In a first variant, referred to as "Variation A" in FIG. 8, the wireless device blanks all multi-connectivity connections. That is, the wireless device creates autonomous gaps on all of its multi-connectivity connections when tuning in to the target cell to acquire MIB and SIB1. For example, in dual-connectivity, the device has two connections; one to a first CG and one to a second CG, which CGs are denoted as CGx and CGy in FIG. 8. In an example LTE dual-connectivity context, the UE has a connection to a MeNB/MCG and a connection to the SeNB/SCG. Of course, each such "connection" may involve multiple carriers, e.g., a PCC and a SCC, and the wireless device may have more than one receiver in use for each connection. The connection to MCG and SCG can include more than two CCs in general. Also, the method is applicable for the case of more than one SCG also.

Continuing the dual-connectivity example, the two connections may be misaligned with respect to the subframe timings up to ±0.5 subframes, which equates to ±500 μs in the LTE context. The frame timing of the target cell, the misalignment between subframe timing between the CGx and CGy connections, and the differences in timing advance values used for the CGx and CGy connections are accounted for when the wireless device chooses which subframes to blank on the DL and UL, respectively, for each of the connections.

In an example embodiment, if subframe timing is similar for the two connections, the number of blanked subframes can be kept the same—i.e., the wireless device uses symmetrical blanking for the two connections. However, if there is a significant difference in subframe timing between the two connections—e.g., the timing difference exceeds a defined threshold—the wireless device blanks one additional subframe on one of the connections, to achieve enough radio time for tuning to the target cell, carrying out the activities needed, and then tuning back to a serving-cell carrier frequency.

In one such example, the subframe timing is considered to be similar for the two connections if the received time difference or received time misalignment between the subframes of the two connections at the wireless device is within a limit or a threshold, e.g. ±33 μs in the LTE context. Here, the plus or minus denotes that the subframe timing of one connection may lead or lag the subframe timing of the other connection. For example, the subframe timing of the MCG may be used as the reference and thus may lead or lag the subframe timing of the SCG. In any case, the wireless device may be configured to deem the subframe timing misalignment between the two connections to be significantly different, if the received time difference or received time misalignment between the subframes of the two connections at the wireless device is outside a threshold. e.g., more than ±33 μs. In such cases, the wireless device in this example embodiment applies asymmetrical blanking to the two connections. By blanking a given connection, reception and/or transmission by the wireless device on that connection is stopped and/or received samples are skipped, thereby creating gaps in the reception and/or transmission.

Although example details presented herein adopt a FDD perspective, the teachings presented herein directly extend in a straightforward manner to TDD-TDD inter-band or TDD intra-band, or to a combination of FDD and TDD inter-band carriers (aka TDD-FDD or FDD-TDD carrier aggregation). Further, in practice, each receiver in a given wireless device having multi-connectivity capability may support a set of frequency bands, and this set may be different for different receivers. Some of the frequency bands may, however, be supported by two or more receivers at the wireless device. That circumstance allows the wireless device to exercise some flexibility in which receiver its uses for the concerned bands. Hence, which of the connections/receivers that will be active when tuning in to the target cell depends on which bands are associated with each respective connection, the frequency band of the target cell, and the particular implementation at the wireless device affecting which set of bands is supported by each of the receivers at the wireless device.

In at least some embodiments herein, the wireless device in question operates according to one or more agreed-upon standards or specifications, such as 3GPP standards, and it is contemplated that any such controlling standards are updated to stipulate the conditional use of asymmetric blanking by a wireless device operating in a multi-connectivity configuration. For example, the specifications may dictate that a wireless device operating in a DC configuration will apply asymmetric blanking to its two DC connections when the received signal timing difference between the MCG and SCG exceeds a defined first threshold. That is, when measuring target-cell signals in autonomous measurement gaps during DC operation, the wireless device will apply asymmetric blanking to the two connections if the subframe misalignment between the MCG and SCG exceeds a certain limit.

The controlling standards may define the threshold, or it may be configured dynamically or according to device capabilities. Further, the controlling standards may define the connection to which the additional blanking is applied, or at least define the rules or criteria to be used by the wireless device for choosing which one of the two connections is subjected to the additional blanking. For example, the standard may stipulate that, as a rule, the SCG connection is subjected to the additional blanking, rather than the MCG connection.

In other embodiments, choosing whether to apply asymmetrical blanking and/or choosing which connection is subjected to the additional blanking is left as an implementation detail of the wireless device. The wireless device in such embodiments may base its decision processing on, for example, throughput, provided services, TDD UUDL configuration, etc., when deciding whether to apply the additional blanking on the PCell connection or the PSCell connection.

Figure 9:
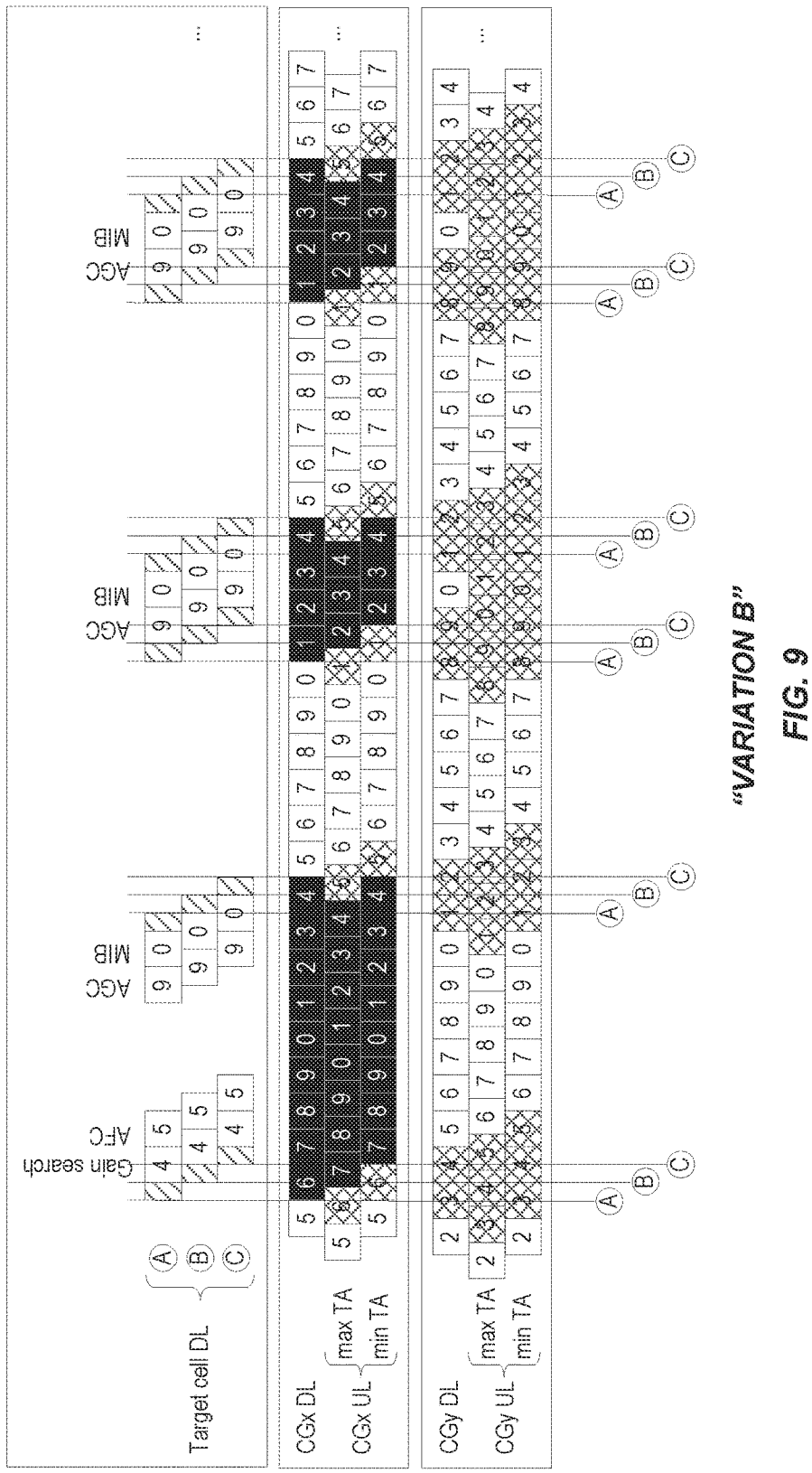

In another variation, referred to as "Variation B" in FIG. 9, the wireless device creates short gaps on other ones of its receivers. Here, the "other ones" of its receivers are the receiver or receivers not used for tuning to the target cell. In an example, the wireless device creates autonomous gaps of up to 4 ms on the connection for which the corresponding receiver is to be used for tuning in to the target cell carrier. The wireless device also is permitted to create an additional gap of up to 5 ms, for AGC/AFC. Thus, if the wireless device performs AGC immediately before reading the first MIB/SIB transport block on the target cell, the combined first gap is 9 ms. On the other connection, i.e. the connection for which none of the receivers are utilized for tuning in to the target cell carrier, shorter gaps are created to allow time for reconfiguring the receivers, or to avoid reception and/or transmission during transient disturbances arising when reconfiguring the receiver(s) used for acquiring the target cell signals.

Each such gap may have an impact on up to two subframes in case of misalignment of the subframe timing between the CGs supporting multi-connectivity operation of the wireless device. Example reasons for reconfiguring the receivers include, for example, the need to change ADC, Analog-to-Digital Converter, sampling frequency, to prevent unwanted emissions, e.g. harmonics of the ADC sampling frequency from polluting the reception on the target cell carrier frequency, or because returning of the receiver(s) being used for target-cell SI acquisition causes transient disturbances within the overall radio transceiver circuitry of the wireless device.

Deciding on which connection(s) to blank fully and which connection(s) to blank only partially may be decided by the wireless device, in dependence on the RF capabilities of the wireless device with respect to supported bands. If the target cell carrier is supported by multiple receivers in the wireless device, the device may take throughput, provided services, TDD UL/DL configuration and impact of blanking, etc., into account when deciding which connection to blank fully and which one to blank only partially. Here, "full" blanking denotes the additional or longer connection blanking inherent in the definition of asymmetrical blanking, while "partial" blanking denotes the lesser or shorter connection blanking. Thus, in a multi-connectivity context, a connection to which full blanking is applied is interrupted for longer than a connection to which partial blanking is applied.

Figure 10:
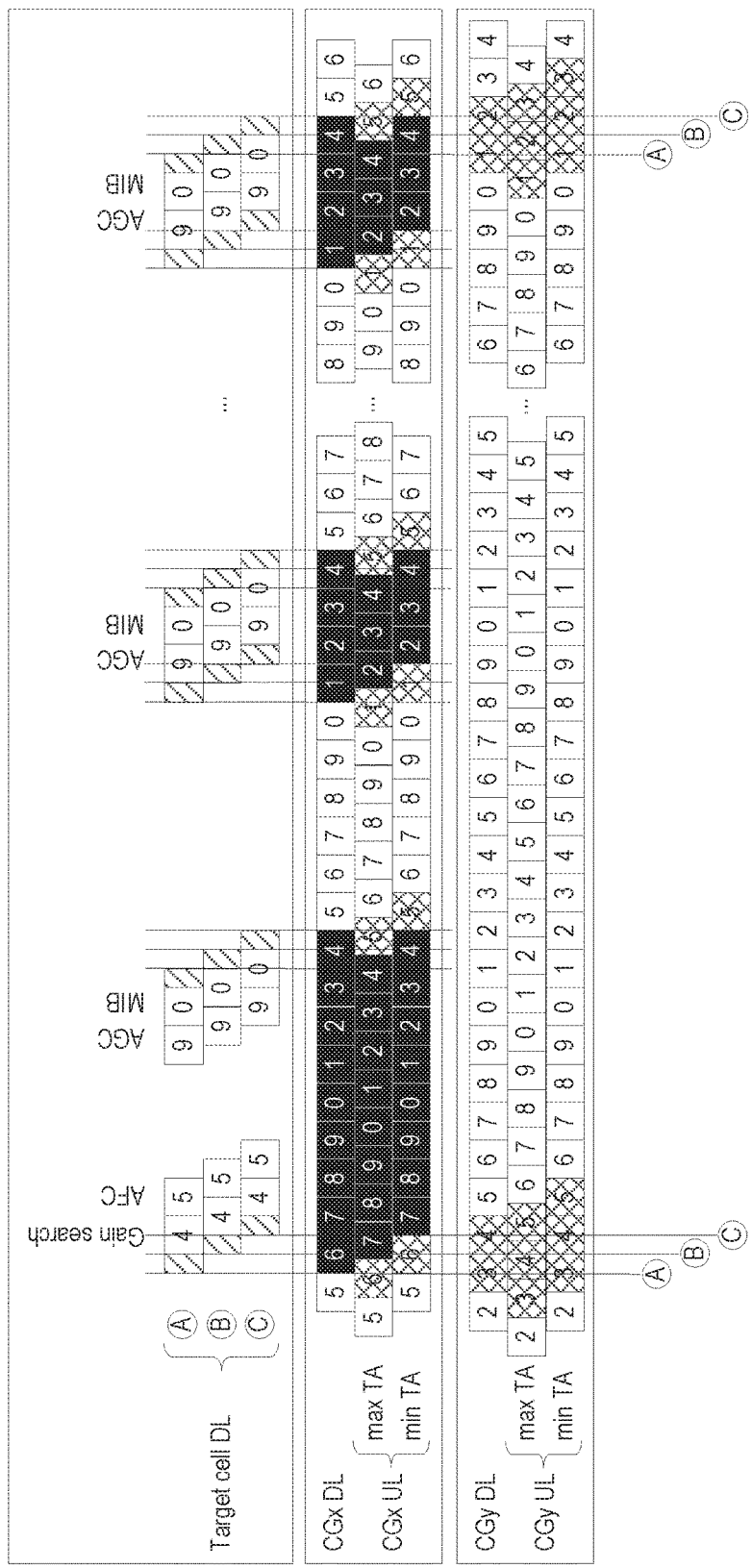

In a third variation, referred to as "Variation C" in FIG. 10, the wireless device applies partial blanking to one or more of the CGs supporting its multi-connectivity operation by blanking beginning and end subframes. The wireless device may apply full blanking for the connection that uses the receiver that is to be tuned to the target cell, and only one partial blanking of up to two subframes at the beginning and one at the end of the SI acquisition such as CGI acquisition (or at the beginning and end of MIB acquisition and SIB1 acquisition, respectively). At the first partial blanking the wireless device reconfigures the ADC sampling frequency in such manner that harmonics are avoided both for the carriers in CGx and CGy, and for the target cell carrier. Besides the up to two subframes that are blanked at the beginning and the end, the wireless device can continue to use the connection for the duration of the CGI acquisition.

It may be up to the wireless device implementation to decide which connection to blank fully, and which one to blank only partially, depending on wireless device RF capability with respect to supported bands. If the target cell carrier is supported by multiple receivers, the wireless device may take throughput, provided services, TDD UL/DL configuration and impact of blanking, etc., into account when deciding which connection to blank fully, and which to blank only partially.

The wireless device may report its asymmetrical blanking capabilities to the network node, e.g., regarding which band combinations it can support by blanking one of the connections only partially when acquiring target cell signals when configured for DC operation. Here, the term "band combination" denotes the frequency bands on which the UE can be connected simultaneously. e.g., during CA operation or in DC operation. The wireless device may signal its asymmetric blanking capability information to the network node proactively or in response to a request received from the network node. The network node may use the above mentioned capability information to configure the wireless device with a band combination that requires blanking on one connection only, in conjunction with requesting the wireless device to acquire the SI of a target cell. The network node may also use the above mentioned capability information to request the wireless device to be configured with another band combination, to acquire the SI of a target cell.

Figure 11:
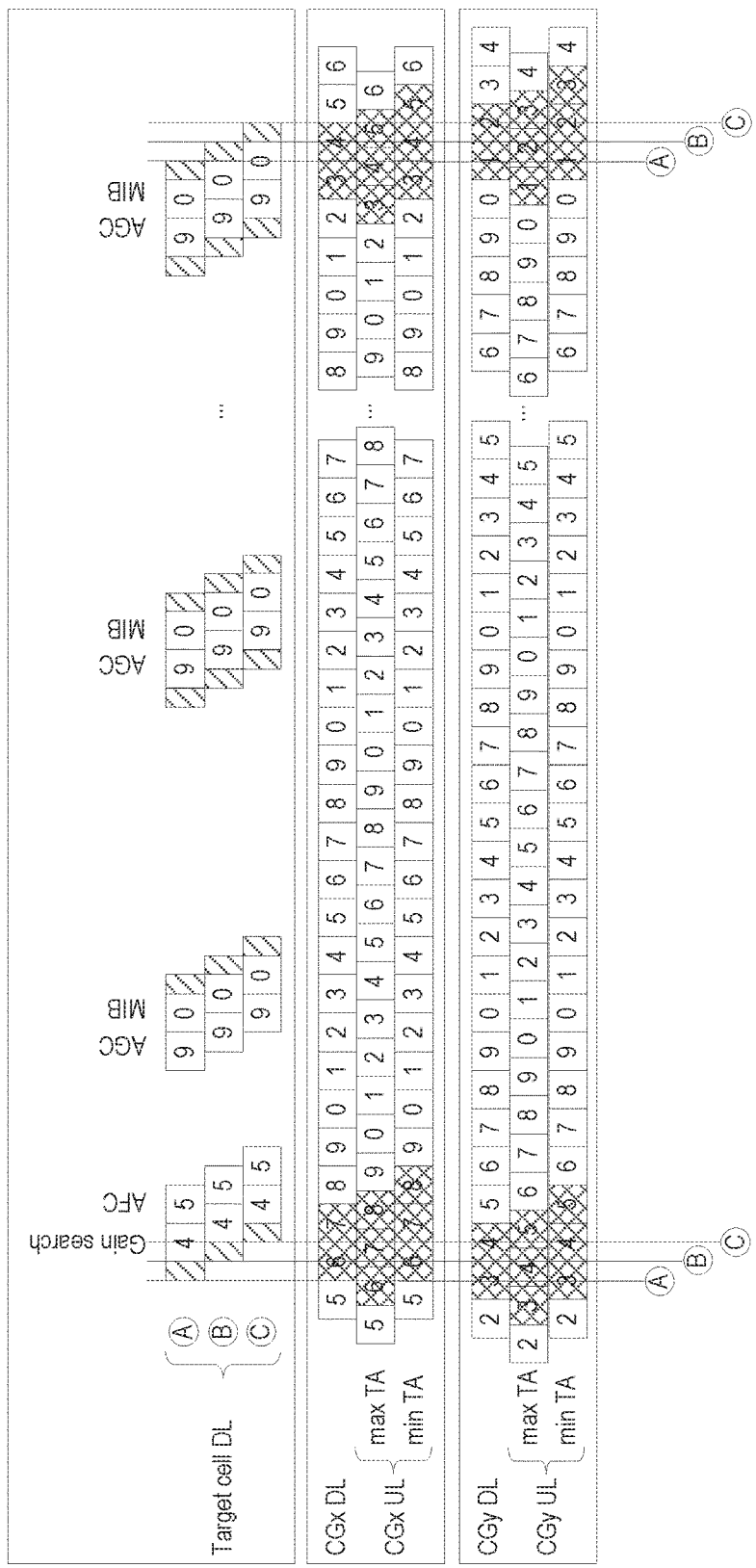

In a fourth variation, referred to as "Variation D" in FIG. 11, the wireless device uses additional receivers when performing target-cell signal measurements while operating in a multi-connectivity configuration. This variation presumes that the wireless device has one or more receivers that are "spare" with respect to its multi-connectivity configuration and can therefore be used for tuning to the target cell. As a further assumption, it is presumed that the wireless device has enough signal processing capacity to acquire the SI/CGI for the target cell while maintaining its connections to the CGs included in its multi-connectivity configuration.

A wireless device equipped to support a greater number of carriers than are involved in its current multi-connectivity configuration represents an example case where one or more spare receivers and sufficient reserve processing capacity would exist. For example, assume that a given wireless device is configured to support up to five DL carriers but fewer than five carriers are currently being utilized for it. The determination of whether sufficient spare capacity is available also may further be conditioned on the aggregated bandwidth, transmission modes in use, number of supported layers, etc., of the cells in the involved CGs. Furthermore, it may be conditioned on the timing of the target cell in relation to one, some or all of the CGs involved in the multi-connectivity configuration of the wireless device.

However, even in cases where the wireless device has spare capacity and has a receiver not in active use, the wireless device may, nonetheless, apply blanking to one or more of its multi-connectivity connections. For example, if the carrier frequency of the target cell is a harmonic of the ADC sampling frequency currently in use for digitizing received signals of the CGs, the wireless device must reconfigure its ADC sampling frequency and that reconfiguration will generally apply to all of the receivers in use at the wireless device. As such, despite having a spare receiver to use for the target cell, at least short gaps or blanks must be imposed on all of the receivers at the wireless device, meaning that carrier reception with respect to its multi-connectivity connections will be at least temporarily blanked as a consequence of the ADC reconfiguration.

Further, there may be design or operational factors that make short blanking of the CG connections desirable when the wireless device activates a spare receiver for acquiring system information for a target cell. For example, the wireless device generally will maintain any spare receivers in a powered-down state and powering up a spare receiver for tuning to the target cell may cause temporary disturbances in the power supplied to the wireless device's RF transceiver circuitry. Improper transmit and/or receive behavior is avoided in such scenarios by temporarily blanking the CG connections at least during the time it takes for the power supply to stabilize after activation of the spare receiver.

As a further example, activation of the spare receiver for acquiring system information from the target cell means that in the aggregate there are just that many more received signal sample values to convey from the radiofrequency front-end of the RF transceiver of the wireless device to the digital baseband processing circuitry of the wireless device. It may be that the wireless device saves power by running that interface only at the transfer speed needed to support the current number of active receivers and thus must reconfigure the interface to bump up the transfer speed when the previously inactive spare receiver is activated for purposes of tuning to the target cell.

Thus, for a variety of reasons, even when a spare receiver is available, the wireless device may need to blank the connections to the MCG and the SCG for activation of the spare receiver for turning to the target cell. In so doing, the wireless device may blank both connections at the beginning and at the end of the SI acquisition to allow time for switching the ADC sampling frequency to prevent the target carrier and any of the carriers in the CGs included in its multi-connectivity configuration, to be interfered with by harmonics and/or to account for transient disturbances due to activating or deactivating the additional receiver(s)—e.g., compare to activating or deactivating one more carrier in inter-band and non-contiguous intra-band carrier CA configurations. The duration of the blanking imposed by the wireless device is up to two subframes, depending on the timing misalignment between the target cell timing and timing of cells in its multi-connectivity CGs.

Figure 12:
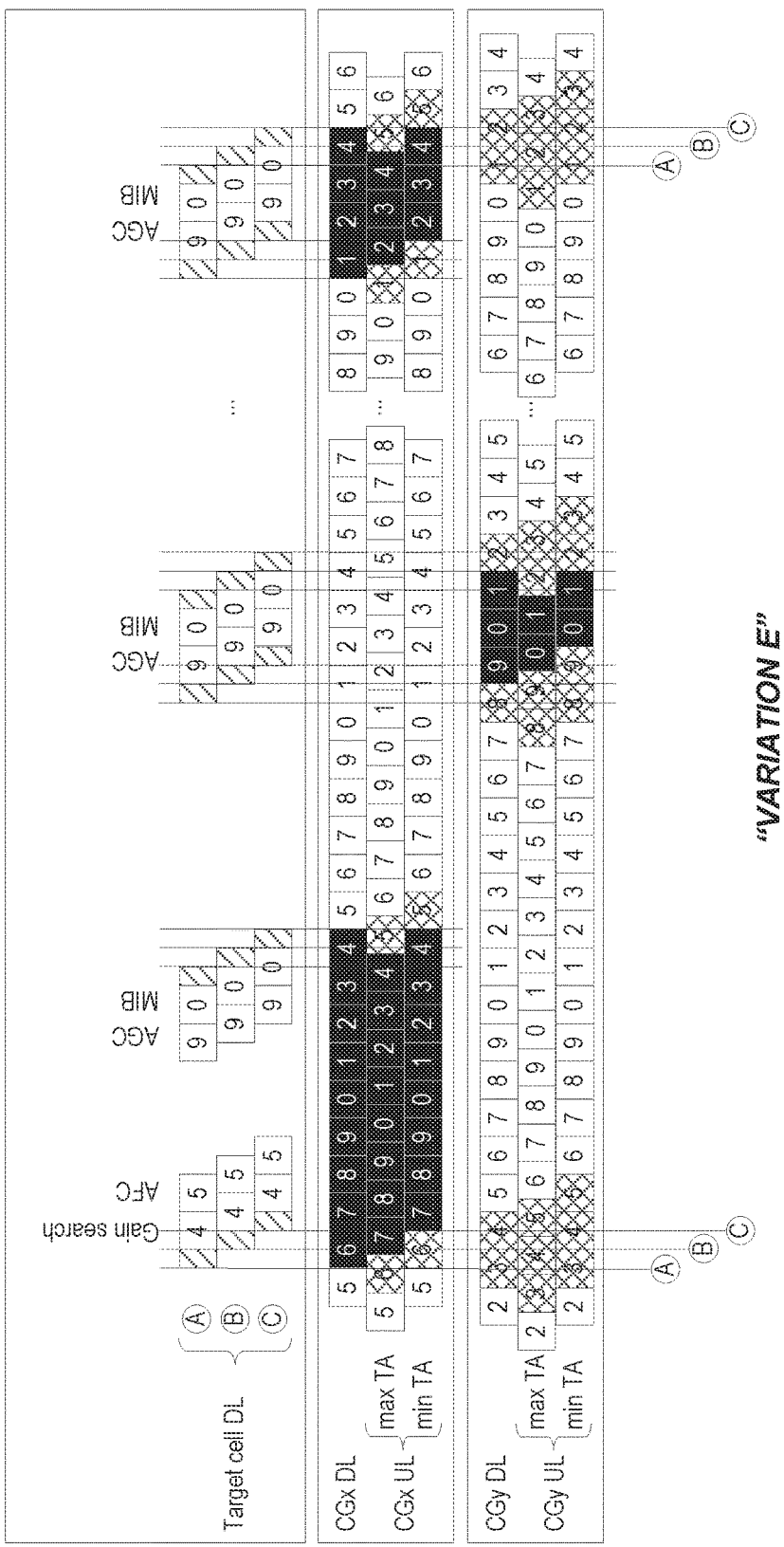

In a fifth variation, referred to as "Variation E" in FIG. 12, the wireless device alternates between carriers. Assume that the wireless device has a DC configuration involving two CGs, denoted as CGx and CGy. Further assume that the wireless device is capable of tuning in to the target-cell carrier with receivers associated with both CGx and CGy. Then, for cases where the receiver(s) used for CGx and CGy can be tuned to the target-cell carrier, the wireless device may alternate between blanking its CGx connection and blanking its CGy connection, to limit the impact on each of the connections. Blanking may also be referred to as "puncturing," e.g., the wireless device alternates between puncturing its CGx connection and puncturing its CGy connection. Blanking one connection and not the other connection represents an extreme form of asymmetric blanking.

The blanking decision may further be based on the type and/or level of activity on each connection, e.g., when both CG connections have independent DRX configured, whether any of them is in inactivity or following a short DRX-cycle, which indicates that it is likely that the connection has less activity. Particularly, the wireless device may, if possible avoid puncturing either of the connections during the "On" periods of its connection-specific DRX cycles. These On periods are the active times at the beginning of the long DRX cycle, when it is likely that signaling from the network node to the wireless device will occur.

In yet another variation, referred to herein as "Variation F", the wireless device has sufficient signal processing and memory resources to tune to a target cell without interrupting its multi-connectivity connections, but does not have a spare receiver to use for that purpose. In one approach, the wireless device selects a receiver usable for tuning to the target cell carrier and imposes a full gap on the multi-cell connection(s) associated with the selected receiver, while imposing smaller gaps—or no gaps—on the connections associated with its remaining receivers. Small gaps may be used, as noted, to prevent spurious reception and/or transmission operation during the times when the selected receiver is being tuned to or back from the target cell carrier.

In a DC case where the wireless device supports "cross-carrier scheduling," the MeNB may use its PCell to send allocations or grants to the wireless device for any SCells included in the MCG along with the PCell. Similarly, the SeNB uses the PSCell to send allocations or grants to the wireless device for any SCells included in the SCG along with the PSCell. Consequently, the wireless device may receive Downlink Control Information, DCI, from the PCell or PSCell indicating a scheduled DL transmission on a corresponding SCell, but may be unable to receive that transmission because of blanking applied by the wireless device on the corresponding SCell. Advantageously, the wireless device in one or more embodiments is configured to send NACK signaling for such allocations.

Further, in one or more embodiments, the wireless device conditionally does nothing with respect to one or more of multi-connectivity connections, when acquiring SI on a target cell. More accurately, a wireless device is provided with, generates, or otherwise is configured with an asymmetric blanking configuration that leaves one or more of the multi-connectivity connections un-blanked with respect to acquiring target-cell SI. According to that blanking configuration, the wireless device blanks only the connection(s) that are directly affected—i.e., necessarily interrupted—as a consequence of tuning one of its receivers to the target cell carrier. The wireless device does nothing—i.e., imposes no blanking—on the connection(s) that are not directly affected by the retuning.

This variation is useful for particular radio architectures, where, for example, the wireless device has separate radios for each CG and has good isolation between those radios—e.g., limited inter-radio cross-talk, disturbances, etc. This variation also may be suitable in cases where the target cell frequency is not a harmonic of the ADC sampling frequency used for received-signal processing at the wireless device. Variation F may be seen as a special case or a subset of the Variations B-E above.

A wireless device may implement one of the outlined exemplary variations, e.g. Variation A, Variation B. or a combination of two or more such variations. In an example configuration, the wireless device is configured to implement Variations A, B and C, where Variation C may represent the default choice. However, the wireless device may fall back to Variation A in cases where, for example, it cannot derive a suitable ADC sampling frequency that prevents harmonics from interfering with the target carrier or one or more of the active carriers associated with its CGs.

Similarly, the approach outlined in Variation C may be used as a fallback choice in cases where the wireless device cannot find or configure an ADC frequency that is suitable for the target cell and its multi-connectivity CGs. For a case where one of the CGs, e.g., CGy, is supported by radio resources at the wireless device that is going to be used for tuning to the target cell, and where the wireless device cannot find or configure an ADC frequency suitable for both the target cell carrier and the active carriers associated with the CGy, it falls back to Variation A of asymmetrical blanking.

Yet another wireless device implementation may support Variations A, B and/or C, and E. When the target cell carrier can be received using a receiver associated with either of CGx or CGy, and if a suitable ADC sampling frequency can be derived, the wireless device performs asymmetrical blanking according to Variation E—i.e., alternating between carriers when applying Variations B or C. Otherwise, the wireless device falls back to Variation C. B or A, depending on the particular situation at hand. See the situational details in the foregoing discussion of Variations A. B and C.

In a further example, the wireless device implementation may support Variation D in addition to any of the above. When the wireless device has sufficient spare resources to tune to the target-cell carrier without interrupting any of its multi-connectivity connections, its uses Variation D, but if such spare capacity does not exist, the wireless device falls back to Variation E, C, B or A, in dependence on the situational details. In the same embodiment or in a further embodiment, the wireless device supports Variation F as a fallback to Variation D in case processing resources at the wireless device support simultaneous acquisition of SI from the target cell while remaining active on the connections CGx and CGy, but where the necessary receiver is occupied with SCell reception for a cell in CGx or CGy.

Broadly, a given wireless device may be configured to implement any of the variations and then select or be told which configuration to use. The particular variation used by the wireless device may change dynamically, e.g., in dependence on the particular situational details. Which particular variations are implemented at the wireless device and which particular variation is performed by the device may be governed by one or more predefined rules, or may be specified directly or indirectly, in terms of requirements specifications. That is, the particular variation used by a wireless device may be based on the particular requirements at hand.

Figure 13:
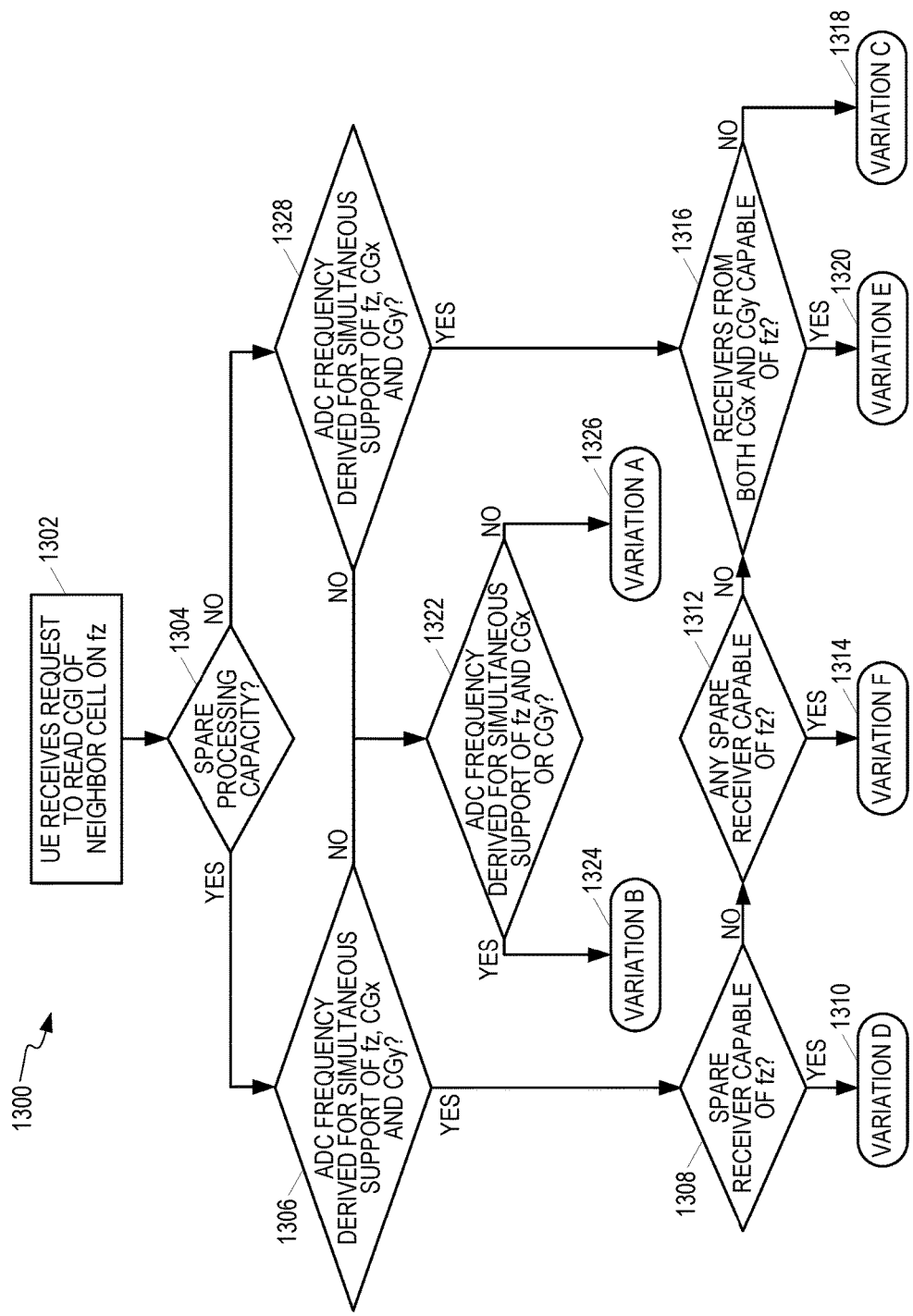
FIG. 13 is a logic flow diagram of a method of processing at a network node and/or at a wireless device, with respect to the asymmetrical blanking variations seen in FIGS. 8-12.

At least one approach to selecting or activating one of the above variations to asymmetric blanking appears in FIG. 13. Broadly, FIG. 13 illustrates different processing flows in consideration of whether the wireless device has spare resources available for acquiring the SI of a target cell and whether it can support the ADC sampling frequency or frequencies needed to simultaneously receive signals from first and second CGs, CGx and CGy, and from the target cell having a carrier frequency fz.

According to the illustrated method 1300, a wireless device, denoted as a UE in the figure, receives a request to read the CGI of a neighbor cell having a carrier frequency fz (Block 1302). The UE checks whether it has spare processing capacity in Block 1304. Here, "spare" means reserve or additional processing capacity sufficient to support acquisition of target-cell SI/CGI while continuing with signal processing operations as needed on the multi-cell connections of the wireless device. For purposes of this example, one may assume that the device has connections to two CGs, denoted as CGx and CGy.

If spare processing capacity exists (YES from Block 1304), processing continues with the UE checking whether or not there is an achievable ADC frequency suitable for simultaneously supporting digitization of signals received on the target-cell frequency fz and the carrier frequency/ frequencies associated with CGx and CGy (Block 1306). If so, the UE checks whether it has a spare receiver capable of tuning to fz (Block 1308). If so, the UE uses Variation D of the blanking techniques taught herein (Block 1310). That is, the UE may not blank any of its multi-connectivity connections in association with acquiring the target-cell information, or it may apply on very short blanking, corresponding to any transients associated with any of receiver activation or deactivation, ADC reconfiguration, receiver tuning/retuning, etc.

If the result of Block 1308 is "NO", processing continues with the UE checking whether it has a spare receiver capable of tuning to the target-cell carrier frequency fz (Block 1312). If so, the UE acquires the target-cell information according to the Variation F operations described above (Block 1314). If not, the UE checks whether receivers being used for CGx and for CGy are capable of being tuned to the target-cell carrier frequency fz (Block 1316). If not, the UE acquires the target-cell information according to Variation C operations as described above (Block 1318). If so ("YES" from Block 1316), the UE acquires the target-cell information according to "Variation E" operations described above (Block 1320).

If the check from Block 1306 is "NO", i.e., no derivable ADC frequency exists that is suitable for all of the carrier frequencies associated with CGx, CGy and the target cell, processing continues with Block 1322. There, the UE determines whether there exists a derivable ADC frequency that is suitable for the target cell and either CGx or CGy. If so (YES from Block 1322), the UE operates according to Variation B (Block 1324). For example, assume that the target-cell frequency fz and the CGy carrier frequency can be simultaneously supported. The UE would then adopt an asymmetric blanking configuration, wherein it blanks one or more cells of the CGy connection during measurement gaps used to acquire the target cell information, and applies shorter blanks or no blanks to the cells of the CGx connection. If short blanks are applied to the CGx connection, they may be very brief in comparison to the CGy blanking. e.g., sufficient simply to account for any radio reconfiguration transients.

If the check at Block 1322 is "NO", processing continues with Block 1326, in which the UE uses Variation A (Block 1326) to acquire the target-cell information. That is, the UE blanks both the CGx and CGy connections in association with acquiring SI/CGI on the target cell. However, advantageously, the UE may asymmetrically blank those connections, e.g., by applying longer blanking durations to CGy as compared to CGx to account for received signal timing differences at the UE with respect to CGx and CGy.

If the check at Block 1304 is "NO", the UE operates in a case where it lacks spare processing capacity. At Block 1328, the UE determines whether it can derive an ADC frequency suitable for all of the involved carrier frequencies associated with target cell and cells of the CGx and the CGy. If not, processing continues with Block 1322 and 1324 or 1326, the operations of which are described above. If so, processing continues with Block 1316 and 1318 or 1320, the operations of which are described above.

In case the ADC sampling frequencies cannot support fz, CGx and CGy simultaneously, it does not matter whether the UE has spare processing capacity, thus, the processing goes to Block 1322. From there, further actions depend on whether the UE can handle fz in combination with CGx or CGy. If so, the UE can puncture one or more of the communication links on one of its connections. If, not, the UE will have to puncture one or more communication links in both connections. Thus, as an interesting aspect of the illustrated processing flow, a UE without the ability to simultaneously sample at frequencies suitable for fz, CGx and CGy will end up in the same processing flow point (Block 1322) regardless of whether it has spare processing capacity (YES or NO from Block 1304). However, for a UE that can simultaneously sample at frequencies suitable for fz, CGx and CGy, the processing flow path it follows depends, at a top level, on whether the UE has spare processing capacity that can be used for acquiring the target-cell SI.

In another aspect of asymmetric blanking as taught herein, connection priorities and, optionally, cell priorities factor into determination of the asymmetric blanking configuration. For example, consider a DC case where the wireless device has a MCG and a SCG. As a first prioritization, the wireless device prioritizes the MCG over the SCG. As one example, if/when the wireless device uses asymmetric blanking, it applies more blanking to the SCG connection—i.e., it favors or prioritizes the MCG connection by blanking that connection less than it blanks the SCG connection. For example, the wireless device accounts for received signal timing differences between the MCG and SCG cells by applying a somewhat longer blanking to the SCG connection at the measurement gaps selected by the wireless device for acquiring target cell information. Here, "somewhat longer" is used in a relative sense, to denote that substantially aligned gaps may be imposed on both the MCG and SCG connections but that the blanking on the SCG connection may start before or continue after the blanking on the MCG connection, to account for subframe misalignment between the cell(s) of the MCG and the cell(s) of the SCG.

Priority also may be applied on a cell basis. For example, the MCG is prioritized over the SCG and within the MCG the PCell is prioritized over any SCells. Such prioritization offers advantages in systems that use the PCell for mobility management signaling, Radio Resource Control, RRC, signaling, etc. The wireless device may conditionally prioritize the MCG over the SCG, in dependence on one or more criteria related to radio characteristics, e.g. mobility radio environment, and/or quality of the connections, such as determined from Channel Quality Indicators, CQIs. SINR, and/or Block Error Rate, BLER, RSRQ, RSRP, etc.

In case the wireless device is moving at speed, or is in a harsh radio environment having rapidly varying signal conditions, or where the quality of connection is bad—e.g. CQI is below threshold and/or BLER above threshold—the wireless device may prioritize the PCell reception to avoid missing handover signaling. Such signaling is provided in the form of RRC signaling from the MeNB associated with the MCG. The prioritization may be made even if it means sacrificing throughput, e.g., in cases where the connection to the SCG is of a higher quality.

Connection prioritization also may account for whether the wireless device has found neighbor cells that are potential candidates for handover, and whether periodic measurement reporting or event-based reporting would be delayed by the acquisition of target-cell information. The prioritization of one CG over another based on radio characteristics may be realized autonomously by the wireless device or may be realized based on configuration received from the network. In the latter case, the involved network node may use the same criteria related to radio characteristics for determining CG priorities.

In another implementation, the wireless device may determine CG priorities based on the corresponding power class or capabilities of the associated network nodes. Such prioritization schemes have particular advantages in heterogeneous networks, where the radio base stations or access points are of different types and can have significantly different transmit power levels. As a general rule, the wireless device may prioritize the CG served by a higher power class radio network node, because higher-power radio nodes will generally provide larger cover areas for the wireless device. The wireless device may also be configured by the network as to which of its CG should be prioritized by the wireless device.

In case the wireless device is stationary and in favorable radio environment with a good connection quality for the PCell and a small risk for having to be handed over to a better cell, the wireless device may prioritize the connection to the CG that enables highest throughput or is associated with a prioritized service. For example, it may prioritize Voice over LTE, VoLTE, or streaming services over bursty data traffic. The wireless device may deduce the type(s) of services being supported by its two or more multi-connectivity connections based on other information, e.g., by recognizing that a given connection is associated with a SPS configuration, or by considering the DRX configurations at issue. Longer or shorter DRX cycles are characteristic of different types of traffic.

In another example, the wireless device is operating in a DC configuration but is only using the UL of one of the connections at any given time. In such cases, the wireless device may prioritize the connection with the UL that is in use over the connection where only the DL is being used. For example, one of the connections may be used only for Multimedia Broadcast Multicast Service, MBMS, on the DL. This type of prioritization scheme allows the wireless device to receive RRC signaling and to provide measurement reports, CSI reports, or other feedback, to the network node, thereby securing mobility functions or other critical functions.

Yet another exemplary implementation is to prioritize one CG over another CG based on the activation status of the serving cell(s) in a CG. For example, in a DC configuration, the MCG includes at least a PCell, and the SCG includes at least a PSCell. The MCG may include one or more SCells and the SCG also may include one or more SCells. The PCell and PSCell are always activated with respect to the wireless device, however SCells can be individually deactivated. For example, the CG containing activated SCell(s) is prioritized over CG containing deactivated SCell(s). In case both CGs contain deactivated SCells, the wireless device would prioritize the CG having fewer deactivated SCells.

According to this scheme, the wireless device creates autonomous measurement gaps in the CG that contains deactivated SCell(s) or the larger number of deactivated SCells. The wireless device is scheduled only on the PCell, the PSCell and the activated SCells. Therefore, this method minimizes the adverse impact of autonomous gaps on user throughput. The wireless device may also be explicitly configured by the network node to prioritize the CG with deactivated SCell(s) or with the largest number of SCell(s).

In another embodiment, the DRX configurations of the wireless device with respect to the CGs included in its multi-connectivity connection are used to determine priorities between CGs. In one such scheme, the wireless device prioritizes one CG over another CG by determining which CG is associated with the shorter DRX cycle at the UE. Prioritization along these lines means that the UE would, when asymmetrical blanking is in use, blank the lower-priority CG connection and not blank the higher-priority CG connection, or at least apply shorter or less blanking to the higher-priority connection. This method minimizes the loss of user throughput or scheduling due to autonomous gaps.

The wireless device may determine these prioritizations or the network may configure them. In cases where the wireless device determines how to prioritize any two or more connections in a multi-connectivity scenario, it may be configured to send signaling or otherwise indicate to the network which priority scheme(s) are in use, or at least which prioritization rule(s) it is using to determine priorities.

A supporting network node as contemplated herein may deduce from existing or future extended wireless device capability reports whether or the wireless device is capable of acquiring target-cell information with only minor (less than Rel.10 legacy) impact on any of the ongoing connections of the device in a multi-connectivity configuration. In case the acquisition request towards the wireless device implicates band combinations that the wireless device has indicated it supports, the network node may expect that at least one of the device's two or more connections will be maintained except for short gaps of 1-2 subframes, e.g., for switching ADC sampling frequency to prevent harmonics from interfering with any of the received signals.

The network node may also query the wireless device to determine whether it can support acquisition of target-cell information while simultaneously maintaining one or two active connections. This determination may be made with respect to the combination of carriers relevant for that particular network area, and conditioned on the number of carriers not exceeding the capabilities of the wireless device, which is limited in terms of the number of carriers it can support in total, the aggregated bandwidth it can support, etc.

The network node may alternatively apply DTX detection to learn the behavior of a particular wireless device under different load conditions—e.g., varying numbers of carriers, differing aggregated bandwidths, etc. The learned behaviors may be associated with a wireless device brand, model and/or revision information and may be later used to make assumptions with respect to a particular wireless device as to whether or not it will be able to maintain one or more than one of its connections when acquiring target-cell information during multi-connectivity operation.

The network node may also adapt its scheduling of UL and DL resources to which the wireless device is configured in DC over the time period during which the wireless device acquires the SI of a E-UTRA cell. For example, the network node may adapt its scheduling on the PCell and/or the SCell(s) in the MCG and on the PSCell and/or the SCell(s) in the SCG, by taking into account the wireless device requirements in terms of the minimum number of ACK/NACKs the wireless device should send under continuous DL allocation over the SI acquisition time—i.e., a requirement for the wireless device to send at least "X" ACK/NACKs, where "X" is some specified number. The requirements depend on whether the wireless device is operating in the synchronous or asynchronous DC scenarios described earlier herein.

For example, the network node, which may be a SeNB for example, schedules the wireless device on serving cells in the SCG—the PSCell and/or any SCells of the SCG—less frequently when the wireless device is operating in the asynchronous multi-connectivity scenario as compared to the case when the wireless device is operating in synchronous multi-connectivity scenario. This approach has advantages because in the unsynchronized case, the wireless device will create a larger number of aggregated autonomous gaps.

Consider DC operation of a wireless device with respect to a first CG, e.g., a MCG, and a second CG, e.g., a SCG. The MCG may operate either in FDD mode or TDD mode, and the same is true for the SCG. Further, the DC may be synchronous or asynchronous, e.g., the subframe timing misalignment between MCG signals and SCG signals received at the wireless device may be within or outside a defined threshold. Consequently, there are a total of four operating scenarios or cases: (1) FDD-FDD DC with synchronous mode. (2) FDD-FDD with asynchronous mode, (3) TDD-TDD with synchronous mode, and (4) TDD-FDD with synchronous mode. In the future, other cases can also be envisioned, e.g. TDD-TDD with asynchronous mode, etc. Here, "FDD-FDD DC with sync" connotes the case where the MCG-SCG are both operating in FDD mode, and where the received timing difference from MCG and SCG at the wireless device is below certain threshold, e.g. 33 μs. The same notational meaning attends the other enumerated cases.

Consider a synchronous DC case where the involved wireless device does not support a CA or DC band combination that includes the target-cell carrier frequency fz with any of the MCG and SCG carrier frequency or frequencies. In this case, the wireless device may have to puncture both the MCG connection and the SCG connection. For each connection, the wireless device shall be capable of fulfilling legacy behavior, i.e., Rel-8 ACK/NACK timing behavior as defined in 3GGP TS 36.133, version 12.7.0 with respect to ACK/NACK transmissions. The phrase "ACK/NACKs" as used here should be understood to more generally encompass bundled feedback on one or more carriers. For example, under continuous DL allocation during the target-cell CGI acquisition time period—e.g. 150 ms—a wireless device configured with DC in E-UTRA FDD and operating in the synchronous DC scenario is required to send at least sixty ACK/NACKs on the PCell of the MCG, the PSCell of the SCG, and on any activated SCell(s) in the MCG and SCG. In another example, under continuous DL allocation during the CGI acquisition time period, a wireless device configured with DC in E-UTRA FDD and operating in the asynchronous DC scenario is required to send at least sixty ACK/NACKs on each of the PCell, and any activated SCell(s) in the MCG and shall not cause any interruption on any serving cell in the SCG. In yet another example, under continuous DL allocation during CGI acquisition time period, a wireless device configured with DC in E-UTRA TDD and operating in synchronous DC scenario, the number of ACK/NACKs the wireless device is required to send depends on the UL-DL subframe TDD configuration. In case some serving cells are FDD and some are TDD, then the number of ACK/NACKs to be transmitted in different serving cells would depend on whether that serving cell is operating according to the FDD or TDD mode.

In asynchronous DC, also referred to as unsynchronized DC, the same wireless device is allowed to create autonomous gaps extended by one subframe for one of the two DC connections and consequently will send fewer ACK/NACKs on that connection. For example under continuous DL allocation during the CGI acquisition time period, a wireless device configured with DC in E-UTRA FDD and operating in the asynchronous DC scenario is required to send at least sixty ACK/NACKs on the PCell of the MCG and on each activated SCell in the MCG, and is required to send at least forty ACK/NACKs on the PSCell of the SCG and on each activated SCell of the SCG. In another example, under a continuous DL allocation during the CGI acquisition time period and where the wireless device is configured with DC in E-UTRA FDD and operating in the asynchronous DC scenario, the wireless device is required to send at least forty ACK/NACKs on the PCell of the MCG and on each activated SCell of the MCG, and is required to send at least sixty ACK/NACKs on the PSCell of the SCG and on each activated SCell of the SCG. In yet another example under the same operating circumstances, the wireless device is required to send at least forty ACK/NACKs the PCell of the MCG and on each activated SCell of the MCG, and is required to send at least 40 ACK/NACKs on the PSCell of the SCG and on each activated SCell of the SCG.

In yet another example that assumes the same operating conditions or scenario, the wireless device is required to send at least forty ACK/NACKs on the PCell of the MCG and on each activated SCell in the MCG. Moreover, the wireless device is required not to interrupt its SCG connection during acquisition of the target-cell information—i.e., the wireless device imposes no blanking on its link to the PSCell of the SCG and no blanking on its link to any activated SCell in the SCG. The opposite requirement or configuration may also be imposed, where the wireless device is required to send at least forty ACK/NACKs on the PSCell of the SCG and on each activated SCell of the SCG, and to impose no blanking on the MCG connection—i.e., the wireless device imposes no blanking on its link to the PCell of the MCG and no blanking on its link to any activated SCell in the MCG.

In case of E-UTRA TDD scenarios, the number of ACK/NACKs the wireless device is required to send depends on the UL-DL subframe TDD configuration. In case some serving cells included in the multi-connectivity configuration of the wireless device are operating in the FDD mode and some are operating in the TDD mode, the number of ACK/NACKs the wireless device is required to transmit in different ones of the serving cells will depend on whether the cell is a FDD cell or a TDD cell. In a non-limiting example, the PCell of the MCG is a FDD cell and the PSCell of the SCG is a TDD cell.

Thus, in one or more embodiments, asymmetric blanking by a wireless device means that the device transmits a greater or lesser number of ACK/NACK signals on one or more of its connections as compared to one or more other ones of its connections, while acquiring system information for a target cell. The particulars of its asymmetric blanking may be defined according to an asymmetric blanking configuration and, at least in some cases, any applicable external standards dictating the minimum or least number of ACK/NACKs that must be returned over a given period.

Assume that the wireless device is operating in the synchronous DC scenario and that the wireless device is capable of receiving a band combination including fz+MCG or fz+SCG. That is, the target-cell carrier frequency fz is compatible with the frequency band(s) in use for the MCG or is compatible with the frequency band(s) in use for the SCG. Also, assume that fz is in a band not currently being used by any of the serving cells in the DC configuration. In at least some embodiments, a wireless device in such a scenario shall be capable of fulfilling legacy behavior requirements with respect to ACK/NACK transmissions for the CG that is not compatible with fz. For example, if the wireless device supports fz+MCG, then the SCG may have to be blanked during acquisition of the target-cell information on fz. The wireless device may impose no gaps on the other connection, the MCG connection in this example, or may impose only relatively short gaps on the MCG connection to allow for radio reconfiguration transients associated with tuning to or from fz.

In asynchronous DC, the same wireless device according to at least some embodiments is allowed to create autonomous gaps extended by one additional subframe on one connection and short gaps of one subframe on the other connection, or autonomous gaps similar to legacy behavior on one connection and short gaps of up to two subframes on the other connection. The wireless device may be configured to "optimize" its blanking by alternating which connection is blanked for longer times and which carrier is blanked for shorter times, at least to the extent that it can perform such alternation while still sending at least as many ACK/NACKs on the carriers as could be sent without alternation.

Now consider a DC operating scenario involving either synchronous or asynchronous DC, where the wireless device in question is capable of receiving the band combination fz+MCG+SCG, and where fz is in a currently unused band. If the wireless device has to repurpose any internal resources—receivers, processors, memory, etc.—from use for the MCG connection or the SCG connection, to use for acquiring the target cell information, the wireless device shall fulfill legacy requirements with respect to ACK/NACK signaling on the connection whose resources are repurposed and shall not lose or reduce ACK/NACK signaling on the other connection. Thus, the affected connection is punctured or blanked in correspondence with the wireless device using the corresponding resources for acquiring the target-cell information, while the other connection is not punctured or blanked. In at least some embodiments, the wireless device may optimize its selection of which connection it selects for puncturing.

Further requirements may take into account whether there are subsets of carriers among the MCG and the SCG that are common, or in intra-band contiguous setup, by which gaps similar to those for activation and deactivation of carriers may be allowed for the otherwise not-impacted connection. See 3GPP TS 36.133 version 12.7.0. Subclause 7.7.

The 3GPP TS 36.133 Release 12 specifies the wireless device requirements for CGI acquisition time and the minimum number of ACK/NACK for DC operation in synchronous and asynchronous cases. The teachings herein propose a number of specification changes in the context of E-UTRA FDD. Similar changes apply to E-UTRA TDD, except that the minimum number of ACK/NACKs will be different and will depend on UL-DL subframe TDD configurations.

Consider E-UTRAN FDD intra frequency measurements with autonomous gaps for DC operation, and particularly consider the task of a wireless device using autonomous measurement gaps to identify a new CGI of a E-UTRA target cell. DC operation here involves at least at PCell in the MCG and a PSCell in the SCG and no explicit neighbor-cell list is provided to the wireless device for assistance in identifying a new CGI of E-UTRA neighbor cell. As proposed in at least some embodiments herein, the wireless device shall identify and report the CGI when requested by the network for the "reportCGI" purpose. The wireless device may create autonomous gaps in its DL reception and its UL transmission, for receiving the MIB and SIB1 messages in the neighbor cell, according to Clause 5.5.3.1 of 3GPP TS 36.331 version 12.7.0. Note that a wireless device is not required to use autonomous gaps if "si-RequestForHO" is set to false.

If autonomous gaps are used for measurement for the purpose of "reportCGI", regardless of whether or not DRX is used, or whether or not any SCells are configured, the wireless device shall be able to identify a new CGI of E-UTRA cell within:

$T_{identify\_CGI,intra} = T_{basic\_identify\_CGI,intra}$ ms where $T_{identify\_CGI,intra} = 150$ ms. This value represents the time period used in the above equation where the maximum allowed time for the wireless device to identify a new CGI of an E-UTRA cell is defined, provided that the E-UTRA cell has been already identified by the wireless device.

A cell shall be considered identifiable if the following conditions are fulfilled: RSRP related side conditions given in Clause 9.1 of the 3GPP TS 36.133 version 12.7.0 are fulfilled for a corresponding band; and SCH_RP and SCH Ês/Iot are according to Annex B.2.2 in 3GPP TS 36.133 version 12.7.0 for a corresponding band. The MIB of an E-UTRA cell for which the CGI is identified shall be considered decodable by the wireless device provided the applicable PBCH demodulation requirements are met.

The requirement for identifying a new CGI of an E-UTRA cell within $T_{basic\_identify\_CGI,intra}$ is applicable when DRX is not used, as well as when any of the DRX cycles specified in 3GPP 36.331 version 12.7.0 is used.

Within the time. $T_{identify\_CGI,intra}$ ms, over which the wireless device identifies the new CGI of the E-UTRA cell, the wireless device shall transmit at least sixty ACK/NACKs on the PCell and on the PSCell, provided that: there is a continuous DL data allocation, no DRX cycle is used, no measurement gaps are configured, only one code word is transmitted in each subframe, no MBSFN subframes are configured in the PCell, in the PSCell or in any activated SCell(s), and the magnitude of the received time difference between signals from the MCG and the SCG as received at the wireless device is not larger than a first threshold e.g. 30 μs.

Within the time. $T_{identify\_CGI,intra}$ ms, over which the wireless device identifies the new CGI of E-UTRA cell, the wireless device shall transmit at least sixty ACK/NACKs on the PCell and at least forty ACK/NACKs PSCell provided that: there is continuous DL data allocation, no DRX cycle is used, no measurement gaps are configured, only one code word is transmitted in each subframe, no MBSFN subframes are configured in the PCell, in the PSCell or each of activated SCell(s), the magnitude of the received time difference between signals from MCG and SCG at the wireless device is not larger than a second threshold e.g. 500 μs.

Note that ECGI reporting delays occur due to the delay uncertainty when inserting the ECGI measurement report in a Transmission Time Interval. TTI, of the UL Dedicated Control Channel or DCCH. The delay uncertainty is twice the TTI of the UL DCCH. In case DRX is used, the ECGI reporting may be delayed until the next DRX cycle. If In-Device Coexistence, IDC, autonomous denial is configured, an additional delay can be expected.

With the above in mind, it shall be appreciated that, at least on a selective basis, a UE or other wireless device uses a blanking configuration that imposes asymmetrical blanking on the two connections involved in DC operation of the wireless device within the supporting wireless communication network. In such operation, the wireless device has a first connection to a first CG and a second connection to a second CG and "blanking a connection" means to interrupt transmit and/or receive operations with respect to one or more carriers comprising the connection.

In particular, blanking a connection does not necessarily mean that every radio link or carrier included in that connection is blanked, but it does mean that at least one such link or carrier is interrupted. For example, the SCG of a DC configuration includes at least one activated SCell, along with the necessarily included PSCell. By "blanking" the SCG connection, it is meant that the wireless device blanks at least one of the cells in the SCG, e.g., one or more of the activated SCells, but it does not necessary mean that the PSCell or all cells included in the SCG are blanked.

With "asymmetrical blanking," the wireless device does not impose the same interruptions on the two connections. For example, one connection may be blanked by the full width(s) of the measurement gaps created for the purpose of the wireless device tuning to and acquiring SI from a target cell, while the other connection may be only partially blanked, e.g., at times corresponding to any transient conditions associated with tuning a wireless device receiver to or back from the target cell. Additionally, or alternatively, the wireless device uses asymmetrical blanking, where one connection is blanked more than the other connection, to account for signal timing misalignment between the two connections. Additionally. or alternatively, the wireless device uses asymmetrical blanking to account for different priorities between the two connections, the particular requirements or behaviors of its radio circuitry, etc.

The above-described DC example is non-limiting and the wireless device may apply asymmetrical blanking to any two or more connections among a plurality of connections in a multi-connectivity operating scenario. For example, the wireless device and the associated network may support triple connectivity where the device has three connections to three different cell groups, or quad connectivity where the device has four connections to four different cell groups. In such cases, at least a subset of the connections may be asymmetrically blanked, but that does not prevent the wireless device from using the same blanking configuration for one or more other subsets of the connections. For example, the device may consider connection priorities, service type priorities, timing misalignments, etc., across all of the connections, or across particular pairings of the connections, or across defined subsets of the connections, etc.

A wireless device, as contemplated herein, implements an innovative method for acquiring system information, e.g. the CGI of a cell using autonomous gaps when configured with at least two CGs and configured with at least one serving cell per CG. The wireless device may adapt or otherwise configure the manner in which it blanks one or both connections in conjunction with obtaining system information for a target cell so that the impact on the total connectivity in terms of throughput, prioritized services, and/or prioritized connections is minimized. VoLTE is a non-limiting example of the type of service that might be prioritized. Further, as a non-limiting example of connection prioritization, the wireless device may be programmed or otherwise configured to prioritize its MCG connection over its SCG connection, because the MGC is associated with the RRC signaling for both connections and is used to support mobility. The wireless device also may vary or select the blanking method variant it uses based on wireless device implementation, a pre-defined rule or according to configuration information provided by a network node. Further, a network node may be configured to provide CG selection and/or autonomous gap configuration information to a wireless device, for controlling certain aspects of the wireless device's dual-connectivity operation with respect to autonomous gap configuration for acquiring SI for a target cell.

Saying that a wireless device has a connection with a CG means that the wireless device has gone through a random access procedure towards serving cell in the CG acting as a PCell for the CG with respect to the wireless device, and that the wireless device is in the RRC Connected mode. The PCell may additionally be in control of one or more SCells that the wireless device is configured to receive from and/or transmit to. In the current revision of the applicable 3GPP standard(s), there is a tight coupling between PCells and associated SCells—for example, DRX cycles—activity, inactivity—are the same on all aggregated cells under control of the PCell. Further, the cell timing is similar, e.g., at most 30.26 μs of timing misalignment between any two cells in the CG. If the PCell is lost, the involved wireless device shall immediately deactivate the associated SCells. Furthermore, all mobility is facilitated through the PCell, e.g., using RRC signaling etc. Therefore, saying that a wireless device 12 has a connection to a given CG means that it is connected at least to the PCell of the CG and may be further connected to one or more SCells in the CG.

For asymmetric blanking in the DC context, the wireless device may puncture all cells operating under the PCell and the PSCell. However, in dependence on the timing misalignment between the MSG and the SCG, the wireless device may create larger gaps on one or more of the carriers of the SCG (or MSG) than are created by any carrier in the MCG (or SCG), to provide sufficient time on the inter-frequency carrier or another intra-frequency neighbor cell not being a serving cell.

In another example of contemplated wireless device behavior, consider a case where the wireless device uses its PSCell receiver to acquire target-cell information. As a consequence, the PSCell link is interrupted while the receiver is being used to receive the target-cell carrier. In such a case, and particularly where the PSCell is used to transmit scheduling information to the wireless device for any activated SCell associated with the PSCell, it makes little sense for the wireless device to receive and process transmissions from the associated SCells, while the PSCell carrier is blanked. As noted, however, a SCG connection may be blanked by interrupting one or more SCell carriers without also interrupting the PSCell carrier, provided that such operation can be accommodated in view of receiver and processing resource limitations at the wireless device.

While in many scenarios it will be desirable to create gaps only on SCell carriers in one or more of the CGs included in a device's multi-connectivity configuration, whether such an arrangement can be achieved by any particular wireless device at any particular time depends on a number of considerations. These considerations are myriad but include: the supported band combinations for each of the receivers in the device, where such receiver typically supports a super set or a subset of the overall bands supported by the wireless device; the current intra-frequency carrier frequency; the involved inter-frequency carrier, and the RF architecture of the device; the baseband implementation of the device.

In at least one embodiment herein, whether to use asymmetric blanking and/or the particular asymmetric blanking configuration to use is decided on any one or more of the following: the timing misalignment between radio signals received at the wireless device from two or more of the CGs of the two or more CGs included in the multi-connectivity configuration of the wireless device; whether there is a dynamically configured and/or predefined selection rule or rules that control or bias how blanking is applied to the respective connections—for example, the wireless device may blank only the lower priority connection, or may apply more aggressive blanking to a lower-priority one of the connections, e.g., to compensate for timing misalignment; the types of services being supported on the connections, e.g., VoLTE may be supported by a given one of the connections and that service may be deemed as having a higher priority; the relationship of the target cell to one or more cells in one or both connections, e.g., neighbor cell relationships, etc.; whether the wireless device has spare resources, e.g., a spare receiver and spare processing capability, enabling it to tune to the target cell without disrupting any receivers being used for dual-connectivity to the cell groups; whether only one or both connections is/are associated with a receiver in the wireless device that can be used for tuning to the target cell—here "can be used" denotes, e.g., frequency capabilities, etc., such that it is possible for the receiver in question to be configured for use in acquiring system information for the target cell; and whether tuning a receiver of the wireless device 12 to the target cell requires ADC reconfiguration, where such reconfiguration affects operation of the receivers in use for DC operation.

In an example embodiment for a case where the wireless device selects a receiver that is in use for one of the CGs for retuning to the target cell, the blanking configuration imposes "full blanking" on the connection, or at least the specific carrier of the connection, that is associated with the selected receiver, and imposes only "partial blanking" on the other connection. Full blanking extends for the full measurement gap timing or timings, whereas partial blanking extends for a lesser period of time, i.e., less than the measurement gap time or times applied to the other connection, and ideally is not appreciably longer than needed to avoid problematic transmit/receive operations during transient conditions associated with activating or configuring the selected receiver for use in acquiring the system information from the target cell. In at least one such embodiment, the "partial blanking" occurs at the beginnings and ends of the measurement gaps used for acquiring system information from the target cell, as these time instances correspond to whatever transient events are associated with tuning or activating the selected receiver to the target cell and retuning it or deactivating it at the ends of the gaps.

In considering the timing misalignment, the wireless device is configured in one or more embodiments to blank a greater number of subframes on one connection versus the other, to account for the timing misalignment. The wireless device chooses the connection to which the greater amount of blanking is applied based on any one or more of: a preconfigured or dynamically defined selection rule; a cell group prioritization scheme; a component carrier prioritization scheme; relative signal conditions, levels of utilization, types of services, and/or data throughput as between the cell groups or component carriers in the respective cell groups.

In an example embodiment for a case where only one of the connections is associated with a wireless device receiver that is usable for acquiring system information from the target cell, e.g., because of operating bandwidths, tunable frequency spectrum, etc., the wireless device may still "optimize" blanking in some sense by applying full blanking to the connection associated with the usable receiver and by applying no blanking or only partial blanking to the other connection. Further, for the case where both connections are associated with a wireless device receiver that is usable for tuning to the target cell, the wireless device coopts a usable receiver that is associated with a lower priority one of the connections and/or is associated with a lower priority communication service. While full blanking may be applied to the connection associated with this coopted receiver, the wireless device may apply no blanking, or only partial blanking to the other connection. As such, the transmit and/or receive operations on the other connection will experience no or minimal disruption.

Figure 14:
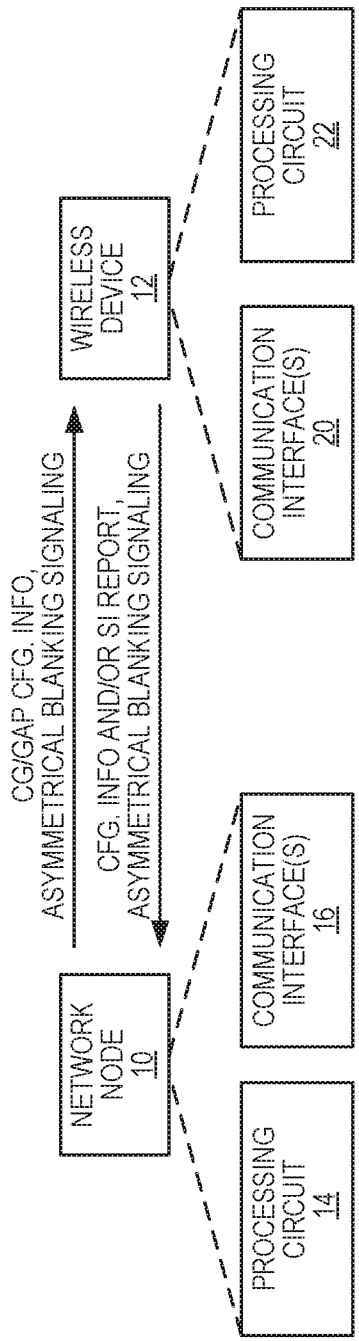
FIG. 14 is a block diagram of one embodiment of a network node and a wireless device, WD, according to the teachings herein.

FIG. 14 illustrates an example network node 10 as contemplated herein, which may be a radio base station, e.g., an eNB, or another type of network node configured for operation in a wireless communication network. One further sees a "wireless device 12," which shall be interchangeably referred to as a "wireless device" and which shall be understood as comprising essentially any type of wireless device or apparatus that is configured for multi-connectivity operation in a wireless communication network. More particularly, the wireless device 12 may be configured according to any of the embodiments discussed above with respect to wireless devices.

Signaling going directly or indirectly between the network node 10 and the wireless device 12 includes, for example, CG and measurement gap configuration information from the network node 10 to the wireless device 12. Further, in as least some embodiments, the network node 10 sends asymmetric blanking signaling. For example, the network node 10 sends indications that indicate to the wireless device 12 that is should use symmetrical blanking or, more broadly, indicators that activate or deactivate asymmetrical blanking by the wireless device 12, e.g., with respect to particular connections. Contemplated signaling from the wireless device 12 includes, for example, asymmetrical blanking signaling. Such signaling comprises, for example, asymmetrical blanking capability information, to indicate to the network node 10 that the wireless device 12 supports asymmetrical blanking. Further, the wireless device 12 may send configuration information indicating its asymmetrical blanking configuration and/or indicating when it is using asymmetrical blanking. Of course, the wireless device 12 also may provide SI reporting.

The example network node 10 includes a processing circuit 14 and one or more communication interfaces 16. In one example where the network node 10 comprises a base station the communication interface(s) 16 include radio frequency. RF, transceiver circuits—i.e., one or more RF receivers and one or more RF transmitters, such as cellular radio transceivers—and may further include a core network communication interface for communicating with mobility management entities, packet routers, etc., such as the "S1" interfaces specified in LTE. Further in this example case, the communication interface(s) 16 may include one or more inter-node interfaces, such as an inter-base station or "sidehaul" interface, such as the "X2" interface specified in LTE.

Similarly, the processing circuit 14, which is operatively associated with the communication interface(s) 16, may comprise more than one processing circuit. For example, the processing circuit 14 includes one or more microprocessors, microcontrollers, Digital Signal Processors or DSPs, Application Specific Integrated Circuits or ASICs, Field Programmable Gate Arrays or FPGAs, or Complex Programmable Logic Devices or CPLDs. In general, the processing circuit 14 comprises appropriately configured digital processing circuitry, and includes or is associated with supporting circuits, such as clock circuitry, power control circuitry, input/output circuitry, and interface circuitry interfacing the processing circuit 14 to the communication interface(s) 16, e.g., for data and control signaling transmission, data and control signaling reception, configuration control, signal strength measurements, etc.

Broadly, the processing circuit 14 may comprise one or more fixed circuits, one or more programmed circuits, or any mix thereof. In at least one embodiment, the processing circuit 14 is specially adapted to carry out any of the network-side processing operations taught herein, based on its execution of computer program instructions stored in a computer readable medium in or accessible to the processing circuit 14.

Although it may be significantly less complicated than the network node 10, the example wireless device 12 of FIG. 14 likewise includes one or more communication interfaces 20 and a processing circuit 22 that is operatively associated with the communication interface(s) 20. In general the communication interface(s) 20 include radio frequency, RF, transceiver circuits—i.e., one or more RF receivers and one or more RF transmitters, such as cellular radio transceivers. In particular, the communication interface(s) 20 in an example embodiment include receiver circuitry enabling the wireless device 12 to simultaneously receive on more than one frequency—e.g., two or more receivers operable for simultaneous reception of more than one downlink carrier on more than one frequency.

The communication interface(s) 20 and the supporting control and configuration of the processing circuit 22 also may permit the wireless device 12 to operate on more than one RAT. For example, the wireless device 12 may support multiple cellular RATs, such as WCDMA and LTE, and may additionally or alternatively support non-cellular RATs, such as Near Field Communications, Device-to-Device communications, WiFi, Bluetooth, etc.

The processing circuit 22 may comprise more than one processing circuit, such as one or more microprocessors, microcontrollers, Digital Signal Processors or DSPs, Application Specific Integrated Circuits or ASICs, Field Programmable Gate Arrays or FPGAs, Complex Programmable Logic Devices or CPLDs, or other digital processing circuitry along with supporting circuits, such as clock circuitry, power control circuitry, input/output circuitry, and circuitry interfacing with and providing measurement, monitoring and control functions for the communication interfaces 20.

Broadly, the processing circuit 22 may comprise one or more fixed circuits, one or more programmed circuits, or any mix thereof. In at least one embodiment, the processing circuit 22 is specially adapted to carry out any of the device-side processing operations taught herein, based on its execution of computer program instructions stored in a computer readable medium in or accessible to the processing circuit 22.

Figure 15:
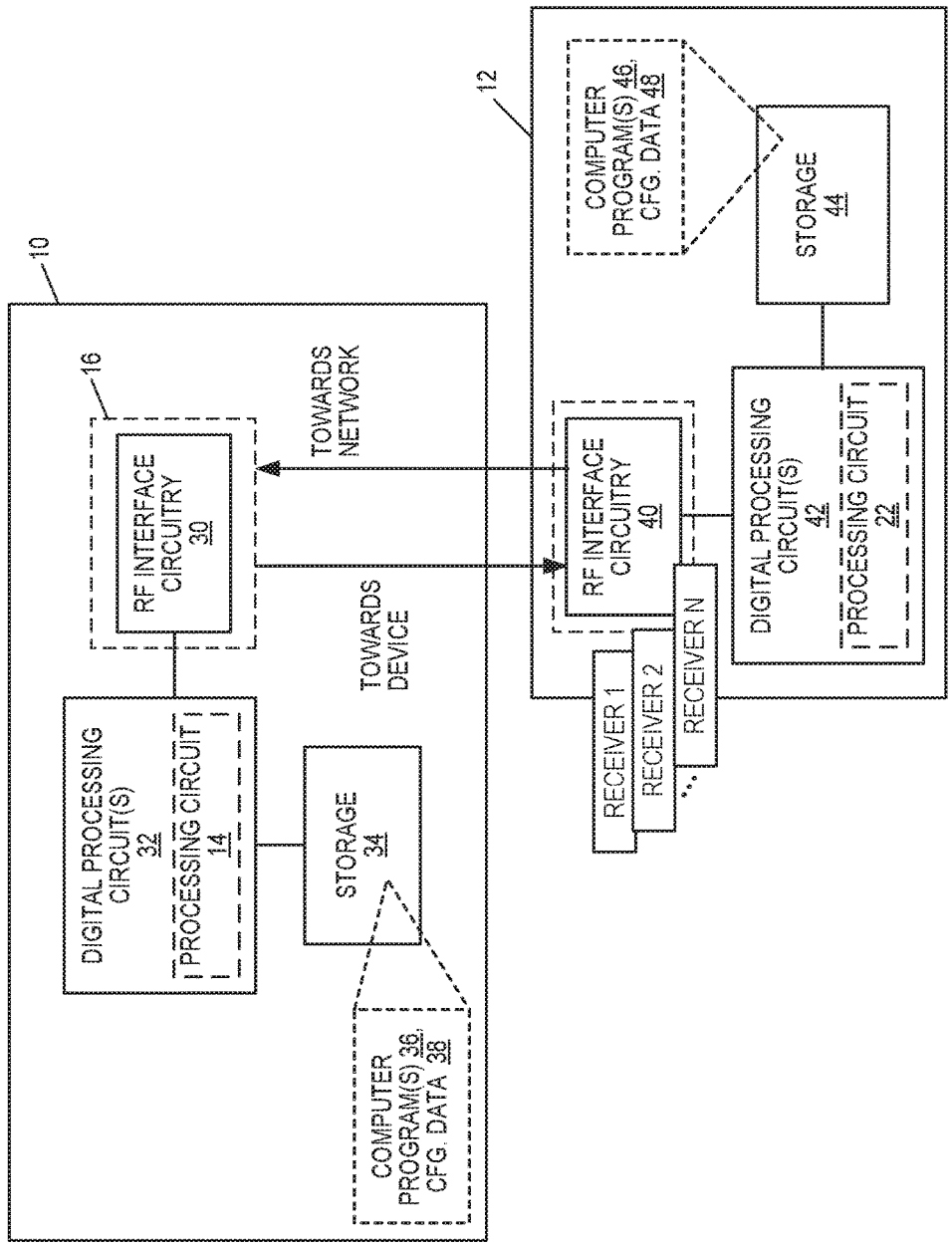
FIG. 15 is a block diagram of example functional or physical circuitry for the network node and wireless device of FIG. 14.

FIG. 15 provides further exemplary details for the network node 10 and the wireless device 12. The network node 10 includes RF interface circuitry 30, which is included in the aforementioned communication interface(s) 16, and further includes one or more digital processing circuits 32, including at least the aforementioned processing circuit 14. Further, one sees that the digital processing circuits 32 are associated with storage 34, which stores a computer program 36 and configuration data 38. The storage 34 comprises one or more types of computer-readable media and provides non-transitory storage for the computer program instructions comprising the computer program 36. In a non-limiting example, the storage includes any one or more hard disk storage, solid-state disk storage, EEPROM circuitry, FLASH circuitry, SRAM circuitry, and DRAM circuitry. In this regard, the storage 34 may comprise a mix of volatile memory for working operations and non-volatile memory for permanent or semi-permanent retention of program and configuration data.

Similarly, the wireless device 12 includes RF interface circuitry 40, which is included in the aforementioned communication interface(s) 20, and further includes one or more digital processing circuits 42, including at least the aforementioned processing circuit 22. Further, one sees that the digital processing circuits 42 are associated with storage 44, which stores a computer program 46 and configuration data 48. The storage 44 comprises one or more types of computer-readable media and provides non-transitory storage for the computer program instructions comprising the computer program 46. In a non-limiting example, the storage includes any one or more hard disk storage, solid-state disk storage. EEPROM circuitry, FLASH circuitry, SRAM circuitry, and DRAM circuitry. In this regard, the storage 44 may comprise a mix of volatile memory for working operations and non-volatile memory for permanent or semi-permanent retention of program and configuration data.

Figure 16:
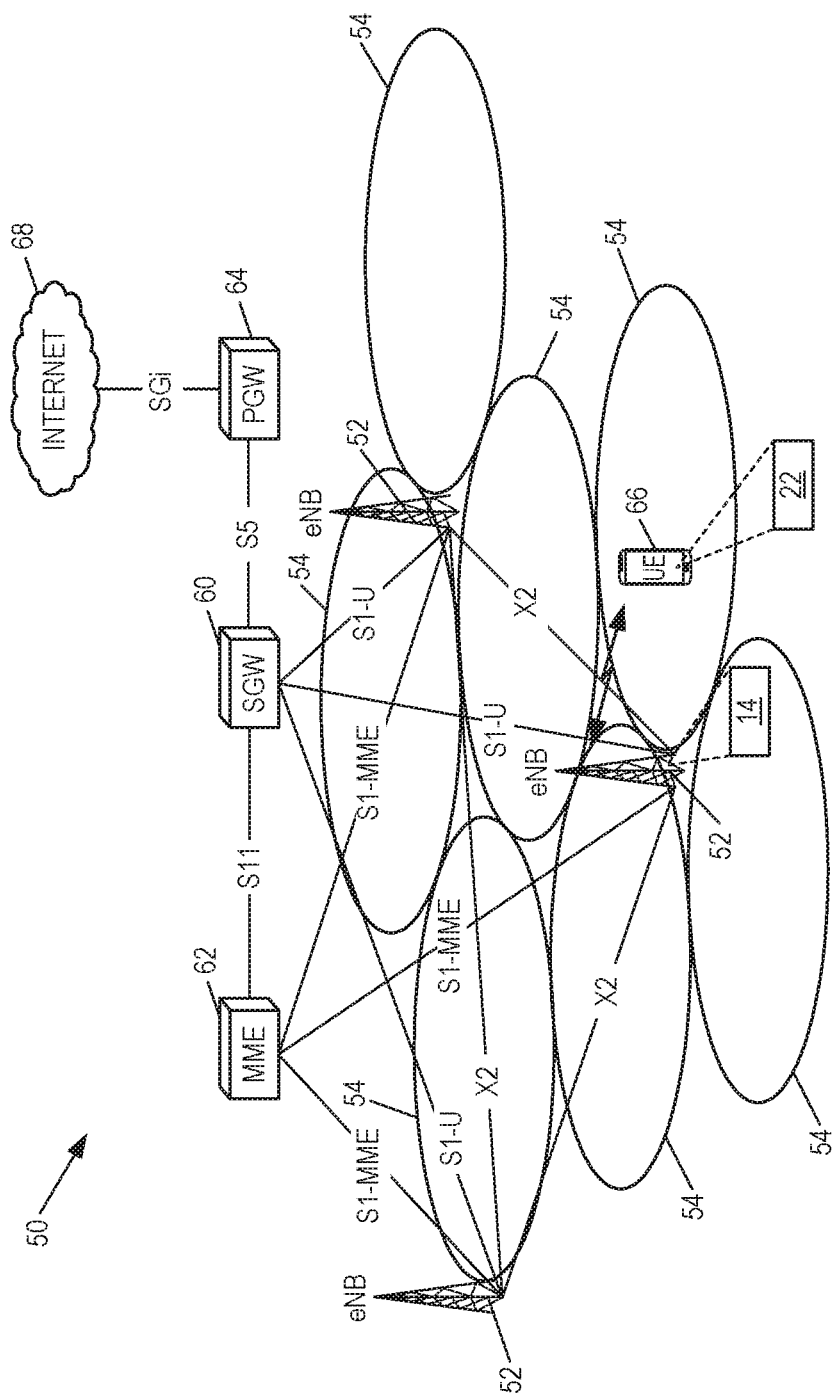
FIG. 16 is a block diagram of one embodiment of a wireless communication network, which includes base stations, "eNBs", and UEs configured as the network node and wireless device of FIG. 14, respectively.

FIG. 16 illustrates an example wireless communication network 50, e.g., an LTE or other such cellular communication network. The illustration is somewhat simplified to ease discussion and it should be understood that the network 50 may include other entities not shown in the illustration, and may include a greater of lesser number of any one or more of the entities and features that are illustrated.

The network 50 includes a Radio Access Network or RAN portion, which in the LTE case is referred to as E-UTRAN. The RAN portion includes a number of base stations 52—shown here as eNBs—and corresponding cells 54. The network 50 further includes a Core Network or CN portion, which in the LTE context is referred to as the Evolved Packet Core or EPC. The CN portion includes a Serving Gateway or SGW 60, a Mobility Management Entity or MME 62, and a Packet Gateway or PGW 64.

The network 50 provides communication services to authorized UEs 66 operating within the coverage areas of any one or more of its cells 54. For example, the network 50 communicatively couples each such wireless device 66 to devices or systems in one or more external networks 68, such as the Internet. Further in this example, any one or more of the base stations 52 may each be configured to act as an instance of the above-described network node 10, and any one or more UEs 66 may each be configured to act as an instance of the above-described wireless device 12. By way of example, at least one of the base stations 52 implements a processing circuit 14 as described above, and at least one of the UEs 66 operating within the service area of the network 50 implements a processing circuit 22 as described above.

In an example embodiment, a network node 10, e.g., one of the base stations 52, is configured for operation in a network 50 that supports multi-connectivity operation where a wireless device 12 has at least two multi-connectivity connections with the network 50, where each connection corresponds to a different CG in the network 50. The network node 10 includes a communication interface 16 that is configured for transmitting signals to the wireless device 12 and receiving signals from the wireless device 12, and a processing circuit 14 that is operatively associated with the communication interface 16.

The processing circuit 22 is configured to determine that the wireless device 12 should apply asymmetrical blanking to two or more connections of the at least two multi-connectivity connections, when acquiring system information for a target cell 54. Further, the processing circuit 22 is configured to send an indication of that determination to the wireless device 12.

In at least one embodiment, the processing circuit 14 is configured to determine that the wireless device 12 should apply asymmetrical blanking based on receiving information from the wireless device 12 indicating a time difference between signals received at the wireless device 12 from the two or more connections. The indication may be explicit—e.g., the actual difference value is provided or otherwise indicated—or may be implicit—e.g., timing information is provided for the involved connections and the processing circuit 14 derives the corresponding timing difference(s). In at least one such embodiment, the processing circuit 14 determines that the wireless device 12 should apply asymmetrical blanking to the involved connections, in response to determining that the time difference exceeds a defined threshold. In the same or another embodiment, the processing circuit 14 is further configured to indicate an asymmetric blanking configuration to be used by the wireless device 12 for the asymmetric blanking.

Thus, in some embodiments, the network node 10 indicates to the wireless device 12 when asymmetric blanking should be used, and relies on the wireless device 12 to select or use an appropriate asymmetric blanking configuration. e.g., a predefined configuration known at the device 12. In other embodiments, or with respect to another wireless device 12 or during other operation conditions, the network node 10 signals asymmetric blanking configuration information. Of course, it is also contemplated that any such operations be predicated on determining or knowing whether a given wireless device 12 supports asymmetric blanking. For example, the processing circuit 14 conditions the above-described determining and sending operations on first determining whether the wireless device 12 has the capability of applying asymmetric blanking. Here. "has the capability" does not denote some theoretical question as to whether the device 12 in question could be modified to perform asymmetrical blanking but rather, instead, whether it in fact actually can operate with asymmetrical blanking.

Where a wireless device 12 does apply asymmetric blanking to two or more connections of its multi-connectivity configuration, the processing circuit 14 in one or more embodiments is configured to adapt scheduling of the wireless device 12 with respect to the two or more connections, to account for the asymmetric blanking. For example, the network node 10 accounts for the asymmetric blanking by avoiding scheduling the wireless device 12 according to the longest blanking applied by the wireless device 12, at least one of the connection(s) subject to that longest blanking. In an extension of that behavior, the network node 10 performs scheduling for each connection and/or for individual carriers within a given connection, based on its specific knowledge of the blanking applied or not applied to that connection or carrier.

Thus, scheduling may be done normally on carriers that are not blanked during the device's acquisition of target-cell information, or only minimally disrupted on carriers that have very short gaps associated with radio reconfiguration transients at the device 12 associated with tuning to or back from the target cell 54. Further, scheduling on the connection/carriers to which full or maximal blanking is applied can be adapted to ensure that the device 12 is not scheduled at times corresponding to such blanking.

Figure 17:
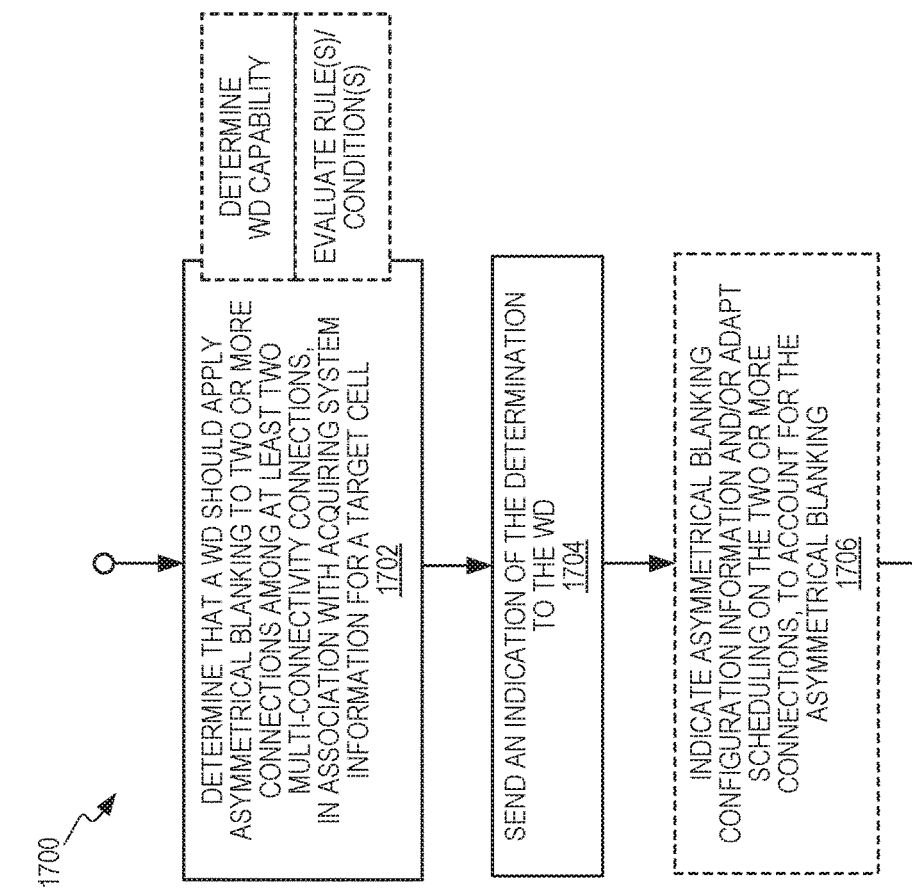
FIG. 17 is a logic flow diagram of one embodiment of a method of processing at a network node, according to the teachings herein.

FIG. 17 illustrates a corresponding method 1700 of operation at a network node 10. The method 1700 includes determining (Block 1702) that a wireless device 12 should apply asymmetrical blanking to two or more connections of the at least two multi-connectivity connections, when acquiring system information for a target cell 54, and sending (Block 1704) an indication of said determination to the wireless device 12. The method 1700 may further include (Block 1706) one or both of: sending an indication of the asymmetric blanking configuration to be used by the device 12, and adapting UL and/or DL scheduling of the device 12 on its respective connections, to account for the asymmetry in the blanking applied by the device 12 to those connections.

The step of determining (Block 1702) that the wireless device 12 should apply asymmetric blanking may include or be preceded by the step of determining whether the wireless device 12 has asymmetric blanking capability. For example, the wireless device 12 indicates whether or not it has the capability of applying asymmetric blanking and/or the particulars of its asymmetric blanking capabilities. FIG. 17 depicts this example operation as "DETERMINE WD CAPABILITY", in the context of Block 1702.

Additionally, or alternatively, the determination of whether or not the wireless device 12 should apply asymmetric blanking to two or more of the connections among its two or more multi-connectivity connections is based on one or more rules or conditions. FIG. 17 depicts this example operation as "EVALUATE RULE(S)/CONDITION(S)", in the context of Block 1702. For example, some frequency bands or band combinations may be designated for or associated with the use of asymmetric blanking. As another example, asymmetric blanking is conditionally enabled in dependence on the received signal timing differences at the wireless device 12, as between the involved connections.

Turning to a detailed example embodiment of the contemplated wireless device 12, it is configured for operation in a wireless communication network 50 that supports multi-connectivity operation where the wireless device 12 has at least two multi-connectivity connections with the network 50, and where each connection corresponds to a different CG in the network 50. The wireless device 12 includes a communication interface 20 configured for transmitting signals to the network 50 and receiving signals from the network 50, and further includes a processing circuit 22 that is operatively associated with the communication interface 20.

The processing circuit 22 is configured to determine that system information is to be acquired for a target cell 54, determine that asymmetrical blanking is to be applied by the wireless device 12 to two or more connections of the at least two multi-connectivity connections, in association with acquiring the system information, and apply asymmetrical blanking to the two or more connections, according to an asymmetrical blanking configuration. The processing circuit 22 in one or more such embodiments is configured to apply the asymmetrical blanking to the two or more connections according to the asymmetrical blanking configuration by transmitting a greater or lesser number of ACK/NACK signals on one or more of the connections as compared to one or more other ones of the connections, while acquiring the system information for the target cell 54.

Consider the following examples regarding the number of ACK/NACKs transmitted by the wireless device 12 on respective connections in view of asymmetrical blanking: assuming three CGs: A/N=40 in CG1, A/N=60 in CG2, and A/N=60 in CG3; assuming three CGs in another case: A/N=40 in CG1, A/N=50 in CG2, and A/N=60 in CG3; assuming four CGs: A/N=40 in CG1, A/N=60 in CG2, A/N=60 in CG3, and A/N=60 in CG4; and assuming four CGs in another case: A/N=40 in CG1, A/N=50 in CG2, A/N=55 in CG3, and A/N=60 in CG4. Here, it will be understood that "A/N" denotes an ACK or a NACK.

In at least some embodiments, the asymmetrical blanking configuration accounts for a timing misalignment between signals received by the wireless device 12 on the two or more connections. The processing circuit 22 in at least one such embodiment is configured to determine that asymmetrical blanking is to be applied by determining that the timing misalignment exceeds a defined misalignment threshold.

In an example scenario, the two or more connections comprise a first CG connection and a second CG connection, and the processing circuit 22 is configured to apply asymmetrical blanking to the two or more connections by applying misaligned measurement gaps to the first and second CG connections, for acquiring the system information. The measurement gaps applied to the second CG connection are longer than the measurement gaps applied to the first CG connection by an amount that accounts for the timing misalignment. Note that the term "misaligned" as used here means that the measurement gaps applied to one connection do not match the measurement gaps applied to the other connection with respect to the subframe timing boundary, but the term does not exclude a case where the leading or lagging edges of the gaps applied to one connection align with the leading or lagging edges of the gaps applied to the other connection. Alternatively, the processing circuit 22 applies no gaps to one of the connections, or only minimal gaps to account for radio switching transients associated with tuning to or from the target cell 54.

In one or more embodiments, the processing circuit 22 is configured to determine that asymmetrical blanking is to be applied by determining that a condition or rule for using asymmetrical blanking is met, or by determining that the network 50 has indicated that asymmetrical blanking is to be applied.

In at least one embodiment, the processing circuit 22 is configured to determine the asymmetrical blanking configuration. For example, the processing circuit 22 obtains the asymmetrical blanking configuration from configuration data 48 stored in the wireless device 12. In other embodiments, or at other times, the processing circuit 22 is configured to obtain the asymmetrical blanking configuration, or an indication of the asymmetrical blanking configuration, from the network 50. It is possible that the wireless device 12 uses a default or given asymmetrical blanking configuration unless a network node 10 specifies a particular asymmetric blanking configuration to be used instead.

The processing circuit 22 in at least some embodiments is configured to send capability information to the network 50, indicating that the wireless device 12 has asymmetrical blanking capability.

The processing circuit 22 is configured to apply asymmetrical blanking to the two or more connections by blanking one of the connections for longer than it blanks another one of the connections. In other words, one or more carriers/cells belonging to one CG included in the multi-connectivity configuration of the wireless device 12 are blanked for longer than one or more carriers/cells in another one of the CGs included in the multi-connectivity configuration. The phrasing "longer than" shall also be understood as encompassing the case where one connection is not blanked at all, while the other connection is blanked during the autonomous measurement gaps used by the wireless device 12 to obtain target-cell information.

The processing circuit 22 may be configured to determine which connection is subjected to the longer blanking according to a defined rule, or according to control signaling received from the network 50. In any of these cases, the asymmetrical blanking configuration according to one or more embodiments accounts for at least one of the following: a timing misalignment between signals received at the wireless device 12 from the CGs corresponding to the two or more connections; differences in connection priorities; differences in connection service type priorities; a relationship between the target cell 54 and any cell 54 or cells 54 associated with the two or more connections; a nature or extent of radio receiver circuitry reconfiguration needed in the wireless device 12 to tune to or back from the target cell 54; whether radio receiver circuitry selected for tuning to the target cell 54 is spare with respect to the two or more connections, or is in use for one of the two or more connections; whether a receiver to be used by the wireless device 12 to acquire the system information for the target cell 54 is currently in use for one of the two or more connections; and any default, preconfigured or dynamically determined rules for controlling asymmetrical blanking at the wireless device 12.

In a specific example, the wireless device 12 is configured to support at least a connection to a first CG and a connection to a second CG, and the processing circuit 22 is configured to: obtain an indication of a received time difference at least between signals received at the wireless device from the first CG and from the second CG; determine, based at least on the received time difference, the asymmetric blanking configuration, wherein the asymmetric blanking configuration defines measurement gaps during which a selected receiver of the wireless device 12 is tuned to the target cell 54 and one or both connections to the first and second CGs is interrupted; and apply the asymmetrical blanking to the two or more connections by blanking one or both of the connections between the wireless device 12 and the first and second CGs according to the asymmetric blanking configuration.

In at least one embodiment, the processing circuit 22 is configured to determine the asymmetrical blanking configuration to be applied by the wireless device to the two or more of the connections in association with acquiring the system information for the target cell 54. Here, it shall be understood that the blanking applied by the processing circuit 22 to at least one of its connections differs from the blanking applied by the processing circuit 22 to at least one other ones of its connections.

Figure 18:
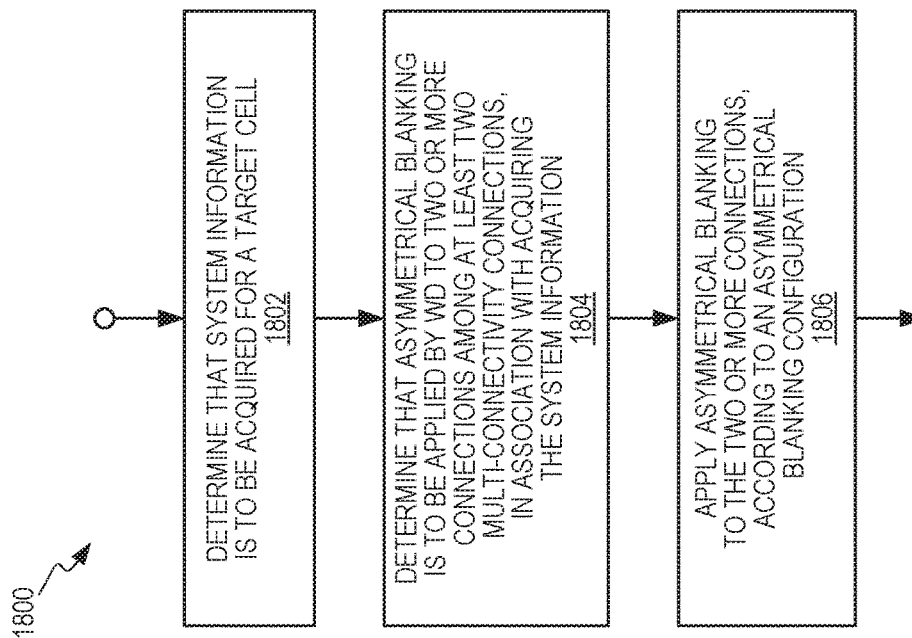
FIG. 18 is a logic flow diagram of one embodiment of a method of processing at a wireless device, according to the teachings herein.

FIG. 18 illustrates an example embodiment of a method 1800 at a wireless device 12 configured for operation in a network 50 that supports multi-connectivity operation where the wireless device 12 has at least two multi-connectivity connections with the network 50, and where each connection corresponds to a different CG in the network 50. The method 1800 includes determining (Block 1802) that system information is to be acquired for a target cell 54, determining (Block 1804) that asymmetrical blanking is to be applied by the wireless device 12 to two or more connections of the at least two multi-connectivity connections, in association with acquiring the system information, and applying (Block 1806) asymmetrical blanking to the two or more connections, according to an asymmetrical blanking configuration.

In another embodiment, the processing circuit 22 is configured to determine that system information is to be acquired for a target cell 54, obtain an indication of a received time difference at least between signals received at the wireless device 12 from a first CG and from a second CG, and determine, based at least one the received time difference, a blanking configuration to use for acquiring the system information for the target cell 54. The blanking configuration defines measurement gaps during which a receiver of the wireless device is tuned to the target cell 54 and one or both connections to the first and second CGs is interrupted. The processing circuit 22 is further configured to blank one or both of the connections between the wireless device and the first and second CGs according to the blanking configuration, where the blanking configuration shall be understood to be an asymmetrical blanking configuration at least under certain conditions or at certain times.

In the above context, the processing circuit 22 blanks one or both connections and determines the blanking configuration based on a frame timing of the target cell, a subframe timing misalignment between the first and second CGs. and timing advance values used by the wireless device 12 with respect to the CGs. For a first case where the timing misalignment is less than a first defined amount, the processing circuit 22 blanks a same number of subframes in each of the CG connections, and, for a second case where the timing misalignment exceeds a second threshold which is equal to or greater than the first defined amount, the processing circuit blanks one or more additional subframes on one of the connections to provide sufficient tuning time for tuning the selected receiver within the wireless device 12 to the target cell 54.

In at least some embodiments, determining the blanking configuration comprises deciding to use the same blanking on two connections if the received signal time difference for the two connections is in a first time range, and deciding to apply asymmetrical blanking as between the two connections if the received time difference is in a second time range greater than the first time range. Where one of the two CGs is a higher priority CG and the other CG is a lower priority CG, applying asymmetrical blanking comprises blanking the connection to the higher priority CG for a first amount of time, which may be zero or no blanking, and blanking the lower priority CG for a longer second amount of time. The longer blanking timing is sufficient for the wireless device 12 to tune to the target-cell carrier and acquire the desired information, e.g., the SI/CGI.

In another example embodiment, the wireless device 12, e.g., via its processing circuit 22, is configured to: determine that SI is to be acquired for a target cell 54; determine an asymmetrical blanking configuration to be applied by the wireless device 12 to two or more of the connections in association with acquiring the SI for the target cell 54, wherein the blanking applied by the wireless device 12 to at least one of its connections differs from the blanking applied by the wireless device 12 to at least one other ones of its connections; and apply the asymmetrical blanking to the two or more connections in association with acquiring the SI for the target cell 54.

Applying asymmetrical blanking to any given two connections may be done in a manner that accounts for differences in how corresponding radio transceiver circuitry being used in the wireless device 12 to support the two connections is affected by the wireless device 12 acquiring the SI for the target cell 54. For example, the nature or extent of the asymmetric blanking is based on the differences in how tuning to or from a target-cell carrier frequency affects operation of the radio receiver or receivers in use for one connection versus operation of the radio receiver or receivers in use for the other connection. Further, as noted, the asymmetry may account for differences in priorities between the two connections, such that where additional blanking on one connection is needed or desired, the wireless device 12 determines which one of two connections the blanking or additional blanking shall be applied, as a function of preconfigured or dynamically defined connection priorities and/or connection service type priorities.

In a further example on the network-side of the contemplated operations, the processing circuit 14 of an example network node 10 is configured to: determine that SI is to be acquired by a wireless device 12 for a target cell 54; and determine an asymmetrical blanking configuration to be applied by the wireless device 12 to two or more of the connections in association with acquiring the SI for the target cell 54. The asymmetrical blanking configuration accounts for any one or more of: a timing misalignment between signals received at the wireless device 12 on the two or more connections; differences in connection priorities; differences in connection service type priorities; the relationship between the target cell 54 and any cell 54 or cells 54 involved in the connections; a nature or extent of radio receiver circuitry reconfiguration needed in the wireless device 12 to tune to or back from the target cell 54; whether radio receiver circuitry selected for tuning to the target cell 54 is spare with respect to the two or more connections, or is in use for one of the two or more connections; whether the receiver to be used by the wireless device 12 to acquire the SI for the target cell 54 currently in use for one of the connections; and any default, preconfigured or dynamically determined rules for controlling asymmetrical blanking at the wireless device 12. The processing circuit 14 in this example is further configured to signal or otherwise indicate the asymmetrical blanking configuration to the wireless device 12.

In yet another example embodiment, the network node 10, e.g., via its processing circuit 14, is configured to obtain information indicating an asymmetrical blanking configuration in use or to be used by the wireless device in blanking two or more of its connections in association with acquiring SI for a target cell 54, and adapt scheduling of the wireless device 12 on one or more cells 54 in at least one of its connections, in dependence on the obtained information.

Adapting scheduling of the wireless device 12 in dependence on the obtained information comprises, for example, controlling uplink and/or downlink scheduling of the wireless device 12 in the one or more serving cells to account for any asymmetry between the blanking applied by the wireless device 12 to any one or more of its connections with respect to the blanking applied by the wireless device 12 to any other one or more of its connections.

Broadly, with asymmetrical blanking, the wireless device 12 imposes a different amount or level of interruption on one connection as compared to another connection. In an example of extreme asymmetry, the wireless device 12 imposes no blanking on one or more of its connections, while blanking one or more other ones of its connections by an amount needed to obtain the SI of the target cell 54. Further, in cases where the wireless device 12 has more than two connections, e.g., connections to three CGs, different blanking may be applied to each connection or to multiple subsets of the connections.

In some embodiments, "interrupting" a connection means interrupting all carriers involved in that connection, or at least all of the downlink carriers involved in that connection. In other embodiments. "interrupting" a connection does not necessarily mean interrupting all carriers involved in that connection, nor does it necessarily mean interrupting all of the involved carriers in the same way. For example, the wireless device 12 may impose what is referred to as "partial blanking" herein on a connection whose radio circuitry within the device 12 is only minimally affected by target-cell tuning and measurements being made by other radio circuitry in the device 12.

In one example, a wireless device 12 is configured to perform certain processing steps or operations in cases where the wireless device 12 is served by a network node 10 and is configured with at least a first CG and a second CG in DC operation. The example processing steps or operations include: obtaining a request to acquire a SI, e.g. CGI, of a target cell 54; obtaining information about a received time difference, Δτ, between signals received at the wireless device 12 from the first CG and the second CG; comparing Δτ with a threshold; determining, based at least on the foregoing comparison, a length of an autonomous gap and/or whether to create an autonomous gap on the first CG and/or on the second CG; creating one or more autonomous gaps of the determined length on the determined first CG and/or the second CG; and acquiring the SI of the target cell 54 during the created autonomous gaps. As an example of using the acquired SI, the wireless device stores the acquired SI and/or reports it to a network node.

In another example, processing operations or steps performed by a network node 10 include: determining, based on one or more criteria, the CG on which an autonomous gap or a larger autonomous gap is to be created by the wireless device 12, for use by the wireless device 12 in acquiring SI of a target cell 54; and configuring the wireless device 12 with information about the determined CG and thereby enabling the wireless device 12 to acquire the SI of the target cell 54. Examples of the one or more criteria considered by the network node 10 in making the foregoing CG determination include any one or more of: radio characteristics, the power class of the involved network nodes, the DRX cycles of the CGs, and the activation status of SCell(s) in the CGs.

Broadly, the teachings presented herein allow a wireless device 12 to limit the impact of target-cell SI acquisition on throughput performance, on perceived quality of services, and on mobility. Modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method at a wireless device configured for operation in a wireless communication network that supports multi-connectivity operation, where the wireless device has a first Cell Group (CG) connection to a first CG in the network and a second CG connection to a second CG in the network, and where the method comprises:
   determining that system information is to be acquired for a target cell;
   accounting for a timing misalignment between signals received at the wireless device on the first and second CG connections by:
      applying misaligned measurement gaps to the first and second CG connections for acquiring the system information; and
      transmitting a greater or lesser number of acknowledgement/non-acknowledgement (ACK/NACK) signals on one of the first and second CG connections as compared to the other one of the first and second CG connections, while acquiring the system information for the target cell during the misaligned measurement gaps.

2. The method of claim 1, wherein transmitting a greater or lesser number of acknowledgement/non-acknowledgement (ACK/NACK) signals on one of the first and second CG connections as compared to the other one of the first and second CG connections comprises transmitting a greater or lesser number of ACK/NACK signals on one or more cells of the first CG connection as compared to one or more cells of the second CG connection.

3. The method of claim 1, wherein the first CG is a Master Cell Group (MCG) and the second CG is a Secondary Cell Group (SCG), and wherein transmitting a greater or lesser number of acknowledgement/non-acknowledgement (ACK/NACK) signals on one of the first and second CG connections as compared to the other one of the first and second CG connections comprises transmitting a greater number of ACK/NACK signals on one or more cells of the MCG connection as compared to one or more cells of the SCG connection.

4. The method of claim 1, wherein the first and second CGs are a Master Cell Group (MCG) and a Secondary Cell Group (SCG), respectively, and wherein transmitting a greater or lesser number of acknowledgement/non-acknowledgement (ACK/NACK) signals on one of the first and second CG connections as compared to the other one of the first and second CG connections comprises transmitting a greater or lesser number of ACK/NACK signals on a Primary Cell (PCell) of the MCG as compared to the number of ACK/NACK signals transmitted on a Primary Secondary Cell (PSCell) of the SCG.

5. The method of claim 1, wherein applying misaligned measurement gaps to the first and second CG connections comprises applying a measurement gap to the second CG connection that is longer than a measurement gap applied to the first CG connection by an amount that accounts for the timing misalignment.

6. The method of claim 1, wherein applying misaligned measurement gaps to the first and second CG connections comprises blanking the first or second CG connection by one or more additional subframes in comparison to the other one of the first and second CG connections, in dependence on a subframe timing misalignment between the first and second CGs.

7. The method of claim 1, wherein the timing misalignment is a subframe timing misalignment between the first and second CGs, and wherein applying misaligned measurement gaps to the first and second CGs comprises deciding which subframes to blank for the first CG and the second CG, respectively, based on the frame timing of the target cell, the subframe timing misalignment between the first and second CGs, and differences in timing advance values used by the wireless device with respect to the first and second CGs.

8. A wireless device configured for operation in a wireless communication network that supports multi-connectivity operation, where the wireless device has a first Cell Group (CG) connection to a first CG in the network and a second CG connection to a second CG in the network, said wireless device comprising:
a communication interface configured for transmitting signals to the network and receiving signals from the network; and
a processing circuit operatively associated with the communication interface and configured to:
determine that system information is to be acquired for a target cell; and
account for a timing misalignment between signals received at the wireless device on the first and second CG connections by:
applying misaligned measurement gaps to the first and second CG connections, for acquiring the system information; and
transmitting a greater or lesser number of acknowledgement/non-acknowledgement (ACK/NACK) signals on one of the first and second CG connections as compared to the other one of the first and second CG connections, while acquiring the system information for the target cell during the misaligned measurement gaps.

9. The wireless device of claim 8, wherein the processing circuit is configured to transmit a greater or lesser number of acknowledgement/non-acknowledgement (ACK/NACK) signals on one of the first and second CG connections as compared to the other one of the first and second CG connections by transmitting a greater or lesser number of ACK/NACK signals on one or more cells of the first CG connection as compared to one or more cells of the second CG connection.

10. The wireless device of claim 8, wherein the first CG is a Master Cell Group (MCG) and the second CG is a Secondary Cell Group (SCG), and wherein the processing circuit is configured to transmit a greater or lesser number of acknowledgement/non-acknowledgement (ACK/NACK) signals on one of the first and second CG connections as compared to the other one of the first and second CG connections by transmitting a greater number of ACK/NACK signals on one or more cells of the MCG connection as compared to one or more cells of the SCG connection.

11. The wireless device of claim 8, wherein the first and second CGs are a Master Cell Group (MCG) and a Secondary Cell Group (SCG), respectively, and wherein the processing circuit is configured to transmit a greater or lesser number of acknowledgement/non-acknowledgement (ACK/NACK) signals on one of the first and second CG connections as compared to the other one of the first and second CG connections by transmitting a greater or lesser number of ACK/NACK signals on a Primary Cell (PCell) of the MCG as compared to the number of ACK/NACK signals transmitted on a Primary Secondary Cell (PSCell) of the SCG.

12. The wireless device of claim 8, wherein the processing circuit is configured to apply misaligned measurement gaps to the first and second CG connections by applying a measurement gap to the second CG connection that is longer than a measurement gap applied to the first CG connection by an amount that accounts for the timing misalignment.

13. The wireless device of claim 8, wherein the processing circuit is configured to apply misaligned measurement gaps to the first and second CG connections by blanking the first or second CG connection by one or more additional subframes in comparison to the other one of the first or second CG connections, in dependence on a subframe timing misalignment between the first and second CGs.

14. The wireless device of claim 8, wherein the timing misalignment is a subframe timing misalignment between the first and second CGs, and wherein the processing circuit is configured to apply misaligned measurement gaps to the first and second CGs by deciding which subframes to blank for the first CG and the second CG, respectively, based on a frame timing of the target cell, the subframe timing misalignment between the first and second CGs, and differences in timing advance values used by the wireless device with respect to the first and second CGs.

* * * * *